United States Patent
Jeong et al.

(10) Patent No.: US 8,511,845 B2
(45) Date of Patent: Aug. 20, 2013

(54) BACKLIGHT UNIT AND DISPLAY DEVICE

(75) Inventors: Chansung Jeong, Seoul (KR); Sungwoo Kim, Seoul (KR); Buwan Seo, Seoul (KR); Soonhyung Kwon, Seoul (KR); Bupsung Jung, Seoul (KR); Seungchoon Bae, Seoul (KR); Sangtae Park, Seoul (KR); Hoon Hur, Seoul (KR)

(73) Assignee: LG Electronics Inc., Seoul (KR)

( * ) Notice: Subject to any disclaimer, the term of this patent is extended or adjusted under 35 U.S.C. 154(b) by 349 days.

(21) Appl. No.: 12/860,704

(22) Filed: Aug. 20, 2010

(65) Prior Publication Data
US 2011/0051412 A1    Mar. 3, 2011

Related U.S. Application Data

(60) Provisional application No. 61/325,287, filed on Apr. 17, 2010, provisional application No. 61/237,587, filed on Aug. 27, 2009.

(30) Foreign Application Priority Data

Aug. 27, 2009  (KR) .................. 10-2009-0079700
Aug. 27, 2009  (KR) .................. 10-2009-0079710
Aug. 28, 2009  (KR) .................. 10-2009-0080249
Nov. 24, 2009  (KR) .................. 10-2009-0114225
Nov. 24, 2009  (KR) .................. 10-2009-0114226
Nov. 24, 2009  (KR) .................. 10-2009-0114227
Apr. 16, 2010  (KR) .................. 10-2010-0035238

(51) Int. Cl.
*F21V 13/04* (2006.01)
*F21V 7/00* (2006.01)
*F21V 5/08* (2006.01)

(52) U.S. Cl.
USPC .......... 362/97.3; 362/97.1; 362/243; 362/246; 362/248; 349/61; 349/62

(58) Field of Classification Search
USPC ............... 362/97.1, 235, 243, 246, 248, 97.3, 362/236; 349/61–62
See application file for complete search history.

(56) References Cited

U.S. PATENT DOCUMENTS
5,206,746 A * 4/1993 Ooi et al. .................. 349/62
(Continued)

FOREIGN PATENT DOCUMENTS
JP   5-341131 A    12/1993
JP   05341131 A  * 12/1993
(Continued)

*Primary Examiner* — Karabi Guharay
(74) *Attorney, Agent, or Firm* — Birch, Stewart, Kolasch & Birch, LLP

(57) ABSTRACT

A backlight unit and a display device including the backlight unit are discussed. According to an embodiment, a light generating device comprising: a first layer; light source devices disposed on the first layer and configured to emit light; a reflection layer disposed on the first layer and configured to reflect the light emitted from the light source devices; a second layer covering the light source devices and the reflection layer; a diffusion layer disposed on the second layer and configured to diffuse the light emitted from the light source devices; and an auxiliary layer having light shielding members placed between the second layer and the diffusion layer, the auxiliary layer being separated from the second layer so as to create an air space between a surface of the second layer and surfaces of the light shielding members, the air space extending along the light source devices.

15 Claims, 19 Drawing Sheets

(56) References Cited

U.S. PATENT DOCUMENTS

| | | | |
|---|---|---|---|
| 5,573,895 A | 11/1996 | Komatsu et al. | |
| 5,600,462 A * | 2/1997 | Suzuki et al. | 349/112 |
| 6,597,417 B1 * | 7/2003 | Veligdan | 349/95 |
| 7,894,048 B2 * | 2/2011 | Fujimoto et al. | 356/73 |
| 2007/0236940 A1 | 10/2007 | Kuroda et al. | |
| 2008/0055929 A1 | 3/2008 | Kuroda et al. | |
| 2010/0061093 A1 | 3/2010 | Janssen et al. | |
| 2011/0141716 A1 * | 6/2011 | Wiesmann et al. | 362/97.1 |
| 2011/0228193 A1 * | 9/2011 | Shin et al. | 349/61 |

FOREIGN PATENT DOCUMENTS

| | | |
|---|---|---|
| JP | 2007-213036 A | 8/2007 |
| JP | 2008-537804 T | 9/2008 |
| JP | 2008-268607 A | 11/2008 |

* cited by examiner

BACKLIGHT UNIT AND DISPLAY DEVICE

This application claims the benefit of Korean Patent Application Nos. 10-2009-0079700 filed on Aug. 27, 2009, 10-2009-0079710 filed on Aug. 27, 2009, 10-2009-0080249 filed on Aug. 28, 2009, 10-2009-0114226 filed on Nov. 24, 2009, 10-2009-0114227 filed on Nov. 24, 2009, 10-2009-0114225 filed on Nov. 24, 2009, and 10-2010-0035238 filed on Apr. 16, 2010, U.S. Provisional Application Nos. 61/325,287 filed on Apr. 17, 2010, and 61/237,587 filed on Aug. 27, 2009, all of which are incorporated herein by reference for all purposes as if fully set forth herein.

BACKGROUND OF THE INVENTION

1. Field of the Invention

Exemplary embodiments of the invention relate to a backlight unit and a display device.

2. Description of the Related Art

With the development of the information society, various demands for display devices have been increasing. Various display devices, such as a liquid crystal display (LCD), a plasma display panel (PDP), an electroluminescent display (ELD), and a vacuum fluorescent display (VFD), have been recently studied and used, so as to meet the various demands for the display devices.

Among the display devices, a liquid crystal display panel of the liquid crystal display includes a liquid crystal layer, and a thin film transistor (TFT) substrate and a color filter substrate that are positioned opposite each other with the liquid crystal layer interposed therebetween. The liquid crystal display panel displays an image using light provided by a backlight unit of the liquid crystal display.

SUMMARY OF THE INVENTION

Exemplary embodiments of the invention provide a backlight unit and a display device.

Embodiments of the invention provide a light generating device including one or more light source devices each including a light emitting unit such as an LED, which can be used in a backlight unit or other device and which address the limitations and disadvantages associated with the background art.

According to an embodiment, the invention provides a light generating device comprising: a first layer; a plurality of light source devices disposed on the first layer and configured to emit light, at least one of the light source devices including a light emitting diode for generating the light; a reflection layer disposed on the first layer and configured to reflect the light emitted from the light source devices; a second layer covering the light source devices and the reflection layer; a diffusion layer disposed on the second layer and configured to diffuse the light emitted from the light source devices; and an auxiliary layer having a plurality of light shielding members placed between the second layer and the diffusion layer, the light shielding members placed at locations corresponding respectively to the light source devices, the auxiliary layer being separated from the second layer so as to create a first air space between a surface of the second layer and surfaces of the light shielding members, the first air space extending along the light source devices.

According to an embodiment, the invention provides a light generating device comprising: a first layer; a plurality of light source devices disposed on the first layer and configured to emit light, at least one of the light source devices including a light emitting diode for generating the light; a reflection layer disposed on the first layer and configured to reflect the light emitted from the light source devices; a second layer covering the light source devices and the reflection layer; and a diffusion layer including a plurality of light shielding members integrated therein, the diffusion layer disposed on the second layer and configured to diffuse the light emitted from the light source devices.

According to an embodiment, the invention provides a light generating device comprising: a first layer; a plurality of light source devices disposed on the first layer and configured to emit light, at least one of the light source devices including a light emitting diode for generating the light; a reflection layer disposed on the first layer and configured to reflect the light emitted from the light source devices; a second layer covering the light source devices and the reflection layer; and an auxiliary layer having a plurality of light shielding members, and fixed to portions of the second layer by a first adhesive layer so as to create a first air space between a surface of the second layer and surfaces of the light shielding members.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
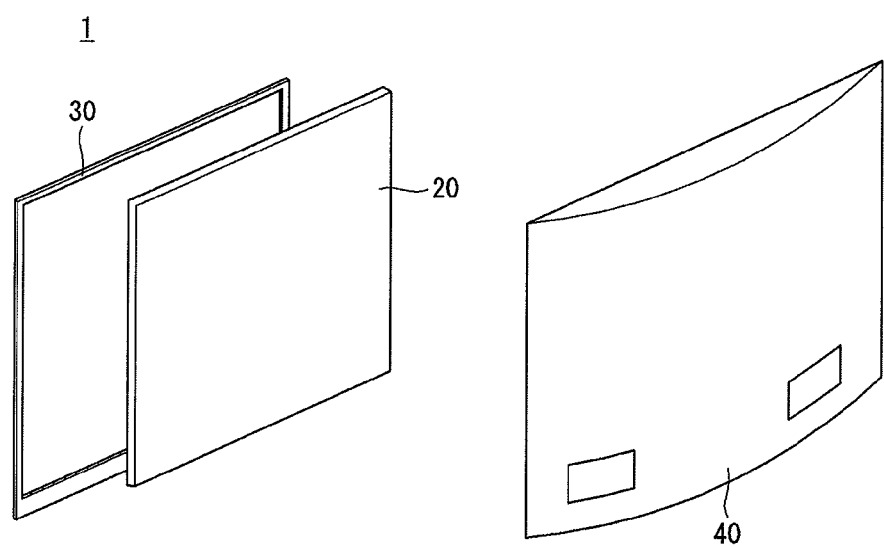
FIG. 1 is an exploded perspective view illustrating a configuration of a display device according to an exemplary embodiment of the invention.

Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention. In the description of each drawing, the same reference characters are used to designate the same or similar components.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to "or" being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the present invention are provided to those skilled in the art in order to describe the present invention more completely. Accordingly, shapes and sizes of elements shown in the drawings may be exaggerated for clarity.

Reference will now be made in detail embodiments of the invention examples of which are illustrated in the accompanying drawings. In this regard, each of all display devices, backlight units, light source devices, and any device that includes such backlight unit or light source device discussed below is operatively coupled and configured. Further, a backlight unit according to embodiments of the invention preferably is fixed to a back of a display panel and has a same or similar size as the display panel to correspond to the entire display region of the display panel. Furthermore, such a backlight unit preferably includes a plurality of light sources which are disposed in arrays, lines, patterns, etc. throughout the entire area of the backlight unit that corresponds to the entire display region of the display panel. As such, the light sources are not just located at one side of the display panel, but are preferably dispersed below throughout the entire display region of the display panel. On the other hand, the backlight unit of the invention can be used as an edge type backlight unit where the light sources are generally located at one or more sides of the display panel.

In these figures, arrows indicate a general light emitting direction of the light source, e.g., a general direction in which the light from a light emitting surface of the light source is emitted, but the light from the light source may emit not necessarily in a single line but through an area in the indicated direction.

According to various embodiments of the invention, any one or more features from one embodiment/example/variation of the invention can be applied to (e.g., added, substituted, modified, etc.) any one or more other embodiments/examples/variations discussed below according to the invention. Further any operations/methods discussed below can be implemented in any of these devices/units or other suitable devices/units.

FIG. 1 is an exploded perspective view illustrating a configuration of a display device according to an exemplary embodiment of the invention. As shown in FIG. 1, a display device 1 according to an exemplary embodiment of the invention may include a front cover 30, a back cover 40, and a display module 20 between the front cover 30 and the back cover 40.

The front cover 30 may cover the display module 20 and may include a front panel formed of a substantially transparent material(s) capable of transmitting light. The front panel is positioned over a front surface of the display module 20 to be spaced apart from the front surface of the display module 20 at a predetermined distance, thereby protecting the display module 20 from an external impact and wear.

Figure 2:
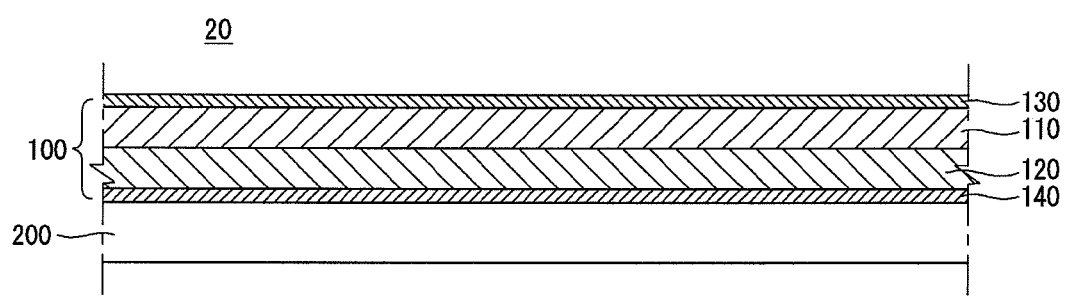
FIG. 2 is a schematic cross-sectional view of a display module according to an exemplary embodiment of the invention.

FIG. 2 is a schematic cross-sectional view of the display module 20 of FIG. 1 according to the exemplary embodiment of the invention. As shown in FIG. 2, the display module 20 of the display device 1 may include a display panel 100 and a backlight unit 200. The backlight unit 200 may have the same or similar size as the display panel 100, and is attached to the back of the display panel 100.

The display panel 100 includes a color filter substrate 110 and a thin film transistor (TFT) substrate 120 that are positioned opposite each other and are attached to each other with a uniform cell gap therebetween. A liquid crystal layer may be interposed between the color filter substrate 110 and the TFT substrate 120.

The color filter substrate 110 includes a plurality of color filters each including red (R), green (G), and blue (B) color filters and may generate a red, green, or blue image when light is applied to pixels. In the embodiment of the invention, each of the pixels includes the red, green, and blue subpixels. Other structures may be used for the pixel. For example, each pixel may include red, green, blue, and white (W) subpixels.

The TFT substrate 120 is a switching element and may switch on and off a pixel electrode. The liquid crystal layer is comprised of liquid crystal molecules. The arrangement of the liquid crystal molecules may vary depending on a voltage difference between a pixel electrode and a common electrode. Hence, light provided by the backlight unit 200 may be incident on the color filter substrate 110 based on changes in the arrangement of the liquid crystal molecules of the liquid crystal layer.

An upper polarizing plate 130 and a lower polarizing plate 140 may be respectively positioned on an upper surface and a lower surface of the display panel 100. More particularly, the upper polarizing plate 130 may be positioned on an upper surface of the color filter substrate 110, and the lower polarizing plate 140 may be positioned on a lower surface of the TFT substrate 120.

A gate driver and a data driver, each of which generates a driving signal for driving the gate lines or data lines of the display panel 100, may be provided on a side of the display panel 100.

Since the above-described configuration of the display panel 100 is merely one example, other configurations may be used for the display panel 100. For instance, the structure of a liquid crystal display panel as an example of the display panel 100 has been described, but the display panel 100 or the display device 1 can be a different type of display panel or device.

As shown in FIG. 2, the display module 20 according to the embodiment of the invention may be configured so that the backlight unit 200 adheres closely to the display panel 100. For example, the backlight unit 200 may be attached and fixed to the lower surface of the display panel 100, more particularly the lower polarizing plate 140. For this, an adhesive layer may be formed between the lower polarizing plate 140 and the backlight unit 200. Preferably light sources (e.g., 220 in FIG. 3) are displayed in arrays or in some patterns throughout the backlight unit 200 so that the light sources are disposed to correspond or cover substantially a display area of the display panel 100.

As described above, because the display device 1 is configured by closely attaching the backlight unit 200 to the display panel 100, the entire thickness of the display device 1 may be reduced. Hence, an external appearance of the display device 1 may be improved. Further, because a structure for fixing the backlight unit 200 is removed or reduced, the structure and the manufacturing process of the display device 1 may be simplified. Further, because a space between the backlight unit 200 and the display panel 100 is reduced, foreign substances may be prevented from penetrating into the space. Hence, a malfunction of the display device 1 and a reduction in the image quality of the display device 1 resulting from the foreign substances may be prevented or minimized.

In one embodiment of the invention, the backlight unit 200 may have the structure in which a plurality of functional layers are sequentially stacked, and at least one of the plurality of functional layers may include a plurality of light sources. Each of the plurality of functional layers constituting the backlight unit 200 may be formed of a flexible material, so that the backlight unit 200 is closely attached and fixed to the lower surface of the display panel 100. Further, a bottom cover for stably positioning the backlight unit 200 may be provided under the backlight unit 200.

The display panel 100 according to the embodiment of the invention may be divided into a plurality of regions. A brightness (i.e., a brightness of light emitted from the corresponding light source) of light emitted from a region of the backlight unit 200 corresponding to each of the divided regions of the display panel 100 is adjusted based on a gray peak value or a color coordinate signal of each divided region. For examples, the backlight unit 200 may be divided into regions, and each of these regions can be selectively and independently driven, so as to be turned on/off, so as to provide dimming effect, so as to provide different light intensities, etc. Hence, a luminance of the display panel 100 may be adjusted. For this, the backlight unit 200 may operate, so that the regions of the backlight unit 200 respectively corresponding to the divided regions of the display panel 100 are dividedly driven.

Figure 3:
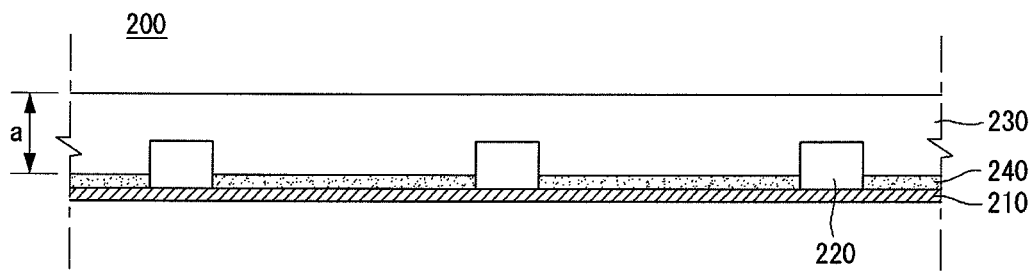
FIG. 3 is a cross-sectional view illustrating a configuration of a backlight unit according to an exemplary embodiment of the invention.

FIG. 3 is a cross-sectional view illustrating a configuration of one example of the backlight unit 200. The backlight unit 200 in this figure or in any other figure can be used in any suitable display device or any device that needs the light. As shown in FIG. 3, the backlight unit 200 may include a substrate 210, a plurality of light sources 220, a resin layer 230, and a reflection layer 240.

The plurality of light sources 220 may be formed on the substrate 210, and the resin layer 230 may be formed on the substrate 210 so as to cover the light sources 220. For instance, the resin layer 230 encapsulates (completely covers) the light sources 220 on the substrate 210.

A connector and an electrode pattern for connecting the light sources 220 to one another may be formed on the substrate 210. For example, a carbon nanotube electrode pattern for connecting the light sources 220 to the connector may be formed on an upper surface of the substrate 210. The connector may be electrically connected to a power supply unit for supplying a power to the light sources 220.

The substrate 210 may be or may include a printed circuit board (PCB) formed of polyethylene terephthalate (PET), glass, polycarbonate (PC), or silicon. Further, the substrate 210 may be a film substrate.

The light source 220 may be at least one of a light emitting diode (LED) chip and a light emitting diode package having at least one light emitting diode chip. In the embodiment of the invention, the light emitting diode package is described as an example of the light source 220.

The light source 220 may be configured by a colored LED emitting at least one of red light, green light, blue light, etc. or a white LED emitting white light. In addition, the colored LED may include at least one of a red LED, a blue LED, and a green LED. The disposition and emitting light of the light emitting diode may be variously changed within a technical scope of the embodiment.

The resin layer 230 positioned on the substrate 210 transmits light emitted from the light sources 220, and at the same time diffuses the light emitted from the light sources 220, thereby allowing the light sources 220 to uniformly provide the light to the display panel 100.

The reflection layer 240 may be positioned between the substrate 210 and the resin layer 230, e.g., on the upper surface of the substrate 210. The reflection layer 240 may reflect the light emitted from the light sources 220 and may again reflect the light totally reflected from a boundary between the resin layer 230 and the reflection layer 240, thereby more widely diffusing the light emitted from the light sources 220.

The reflection layer 240 may be or include a sheet in which a white pigment, for example, titan white is dispersed, a sheet in which a metal deposition layer is stacked on the surface of the sheet, or a sheet in which bubbles are dispersed so as to scatter light, etc. among various types of sheets formed of synthetic resin material(s). Silver (Ag) may be coated on the surface of the reflection layer 240 so as to increase a reflectance of the light. The reflection layer 240 may be formed by coating a resin on the upper surface of the substrate 210.

The resin layer 230 may be formed of one or more of various kinds of resins capable of transmitting light. For example, the resin layer 230 may contain one or at least two selected from the group consisting of polyethylene terephthalate (PET), polycarbonate (PC), polypropylene, polyethylene, polystyrene, polyepoxy, silicon, acryl, etc. Further, a refractive index of the resin layer 230 may be approximately 1.4 to 1.6, so that the backlight unit 200 has a uniform luminance by diffusing the light emitted from the light sources 220.

The resin layer 230 may contain a polymer resin having an adhesion so as to tightly and closely adhere to the light sources 220 and the reflection layer 240. For example, the resin layer 230 may contain an acrylic resin such as unsaturated polyester, methyl methacrylate, ethyl methacrylate, isobutyl methacrylate, normal butyl methacrylate, normal butylmethylmethacrylate, acrylic acid, methacrylic acid, hydroxy ethylmethacrylate, hydroxy propylmethacrylate, hydroxy ethylacrylate, acrylamide, methylol acrylamide, glycidyl methacrylate, ethylacrylate, isobutylacrlate, normal butylacrylate, 2-ethylhexyl acrylate polymer, copolymer, or terpolymer, etc., an urethane resin, an epoxy resin, a melamine resin, etc.

The resin layer 230 may be formed by coating and curing a liquid or gel-type resin on the upper surface of the substrate 210 on which the light sources 220 and the reflection layer 240 are formed. Alternatively, the resin layer 230 may be separately manufactured and then may be attached to the upper surface of the substrate 210.

As a thickness "a" of the resin layer 230 increases, light emitted from the light sources 220 may be more widely diffused. Hence, the backlight unit 200 may provide light having the uniform luminance to the display panel 100. However, as the thickness "a" of the resin layer 230 increases, an amount of light absorbed in the resin layer 230 may increase. Hence, the luminance of light which the backlight unit 200 provides to the display panel 100 may decrease. Accordingly, the thickness "a" of the resin layer 230 may be approximately 0.1 mm to 4.5 mm, so that the backlight unit 200 can provide light having the uniform luminance to the display panel 100 without an excessive reduction in the luminance.

Figure 4:
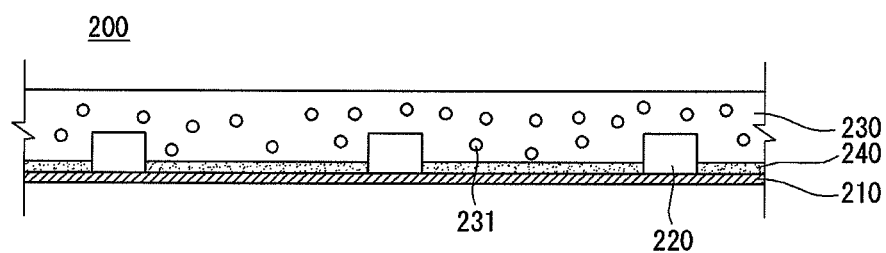
FIG. 4 is a cross-sectional view illustrating another configuration of a backlight unit according to an exemplary embodiment of the invention.

FIG. 4 is a cross-sectional view illustrating another configuration of the backlight unit 200 according to the exemplary embodiment of the invention.

As shown in FIG. 4, the plurality of light sources 220 may be mounted on the substrate 210, and the resin layer 230 may be disposed on the upper surface of the substrate 210. The reflection layer 240 may be formed between the substrate 210 and the resin layer 230.

The resin layer 230 may include a plurality of scattering particles 231. The scattering particles 231 may scatter or refract light incident on the resin layer 230, thereby more widely diffusing the light emitted from the light sources 220.

The scattering particles 231 may be formed of a material having a refractive index different from a formation material of the resin layer 230 so as to scatter or refract the light emitted from the light sources 220. More particularly, the scattering particles 231 may be formed of a material having a refractive index greater than silicon-based resin or acrylic resin forming the resin layer 230. For example, the scattering particles 231 may be formed of polymethylmethacrylate (PMMA)/styrene copolymer (MS), polymethylmethacrylate (PMMA), polystyrene (PS), silicon, titanium dioxide ($TiO_2$), and silicon dioxide ($SiO_2$), or a combination thereof. Further, the scattering particles 231 may be formed of a material having a refractive index less than the formation material of the resin layer 230. For example, the scattering particles 231 may be formed by generating bubbles in the resin layer 230. Other materials may be used for the scattering particles 231. For example, the scattering particle 231 may be formed using various polymer materials or inorganic particles.

In the embodiment of the invention, the resin layer 230 may be formed by mixing the liquid or gel-type resin with the scattering particles 231 and then coating and curing a mixture on the upper surface of the substrate 210 on which the light sources 220 and the reflection layer 240 are formed.

In a direct light manner of the backlight unit, a LED package constituting the light sources 220 may be classified into a top view type LED package and a side view type LED package based on a facing direction of a light emitting surface of the LED package.

Figure 5:
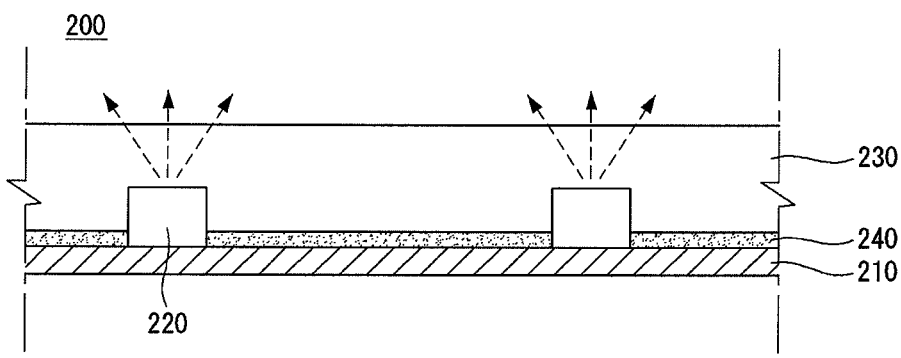
FIGS. 5 to 7 illustrate examples of a direct light type of a backlight unit according to an exemplary embodiment of the invention.
Figure 6:
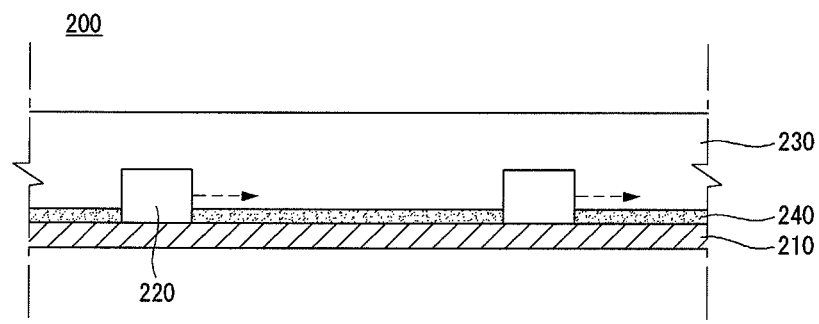
Figure 7:
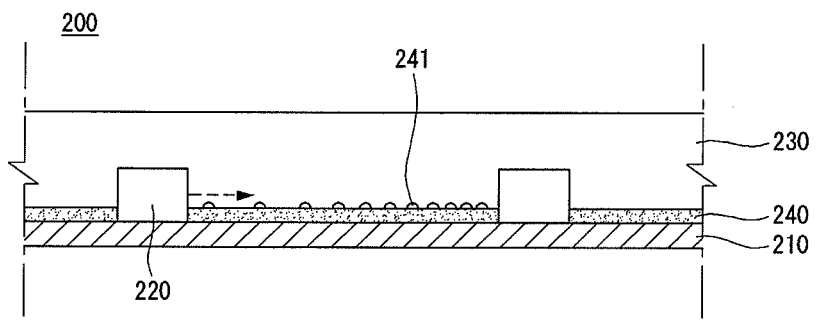

FIGS. 5 to 7 illustrate examples of a direct light type of the backlight unit. More specifically, FIGS. 5 and 6 respectively illustrate a backlight unit having top view type LED packages and a backlight unit having side view type LED packages as the light sources.

As shown in FIG. 5, each of the plurality of light sources 220 of the backlight unit has a light emitting surface on an upper surface of each light source 220. Thus, the plurality of light sources 220 may emit light in an upward direction as shown by an arrow, for example, in a direction perpendicular to the disposition direction of the substrate 210 or the reflection layer 240.

In another example, as shown in FIG. 6, each of the plurality of light sources 220 of the backlight unit 200 has the light emitting surface at a side of each light source 220. Thus, the plurality of light sources 220 may emit light in a lateral direction as shown by an arrow, for example, a direction generally parallel to the disposition direction of the substrate 210 or the reflection layer 240. For example, the plurality of light sources 220 may be configured using the side view type LED packages. As a result, it is possible to address a problem that some light sources 220 may be observed as a hot spot on the screen of the display panel 100. Furthermore, the thin profile of the display device 1 may be achieved because of a reduction of the thickness "a" of the resin layer 230.

As shown in FIG. 7, a pattern may be formed on the reflection layer 240, thereby facilitating a travel of light emitted from the light source 220 to a light source immediately adjacent to the light source 220.

The pattern on an upper surface of the reflection layer 240 may include a plurality of protrusions 241. Light that is emitted from the light source 220 and then is incident on the plurality of protrusions 241 may be scattered or refracted in a direction indicated by an arrow of FIG. 7. A density of the protrusions 241 of the reflection layer 240 may increase in the light emitting direction (represented by the arrow) of the light source 220. Hence, a reduction in a luminance of upward emitted light in an area distant from the light source 220 may be prevented or reduced. As a result, the luminance of light provided by the backlight unit 200 may be uniformized.

The protrusions 241 may be formed of the same material as the reflection layer 240. In this case, the protrusions 241 may be formed by processing the upper surface of the reflection layer 240. Alternatively, the protrusions 241 may be formed of a material different from the reflection layer 240. In this case, the protrusions 241 may be formed by printing the pattern on the upper surface of the reflection layer 240.

The shape of the protrusions 241 is not limited to a shape shown in FIG. 7 and may be variously changed. For example, other shapes such as a prism shape may be used.

FIGS. 8 to 21 illustrate various examples of a diffusion plate which may be used in a backlight unit (e.g., the backlight unit 200) according to an embodiment of the invention.

Figure 8:
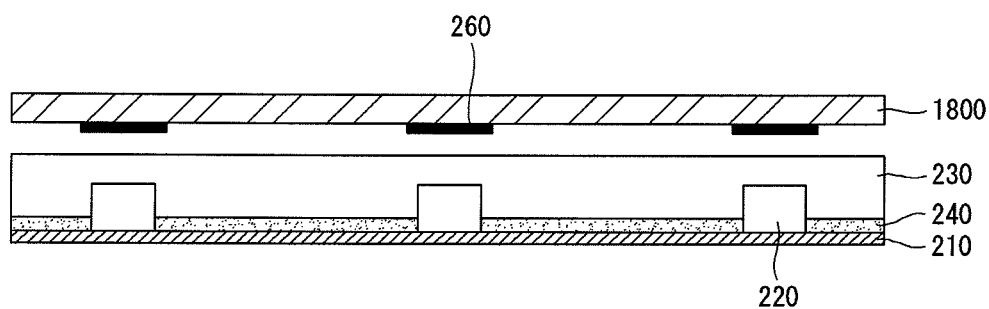
FIGS. 8 to 21 illustrate various examples of a diffusion plate according to an embodiment of the invention.

As shown in FIG. 8, a diffusion plate 1800 may be positioned on the resin layer 230, and a plurality of light shielding parts 260 may be printed on one surface of the diffusion plate 1800. The one surface of the diffusion plate 1800 on which the light shielding parts 260 are printed may be positioned toward the resin layer 230. Because the diffusion plate 1800 may be a hard plate, the diffusion plate 1800 may serve as a supporter of other functional layers and may diffuse light emitted from the light sources 220. The light shielding parts or light shielding layer in this embodiment or in any other embodiments may selectively transmit light and/or selectively reflect light, or may entirely reflect/block light.

Although it is not shown, the diffusion plate 1800 may include a plurality of beads. The diffusion plate 1800 may scatter incident light using the beads to thereby prevent a concentration of light in a predetermined portion. The diffusion plate 1800 may be formed of polycarbonate (PC), polymethylmethacrylate (PMMA), and cyclic olefin copolymer (COC). Other materials may be used.

The light shielding parts 260 may be formed on the diffusion plate 1800 at locations respectively corresponding to the light sources 220. For instance, a center portion of a light shielding part 260 may be aligned with, or off-centered by a predetermined distance from, a center portion of a corresponding light source 220. In another example, one side of the light shielding part 260 may be aligned with one side of the corresponding light source 220. The light shielding parts 260 may prevent or reduce a concentration of light emitted from the light sources 220 in a predetermined portion. The light shielding parts 260 may transmit a portion of light emitted from the light sources 220 and may reflect a portion of light emitted from the light sources 220. For this, the light shielding parts 260 may be formed of titanium dioxide ($TiO_2$). The light shielding parts 260 formed of $TiO_2$ may be white. Hence, the white light shielding parts 260 formed of $TiO_2$ may efficiently reflect a portion of light emitted from the light sources 220 while transmitting a portion of light emitted from the light sources 220.

A method of manufacturing the backlight unit having the above-described structure is as follows.

Figure 9:
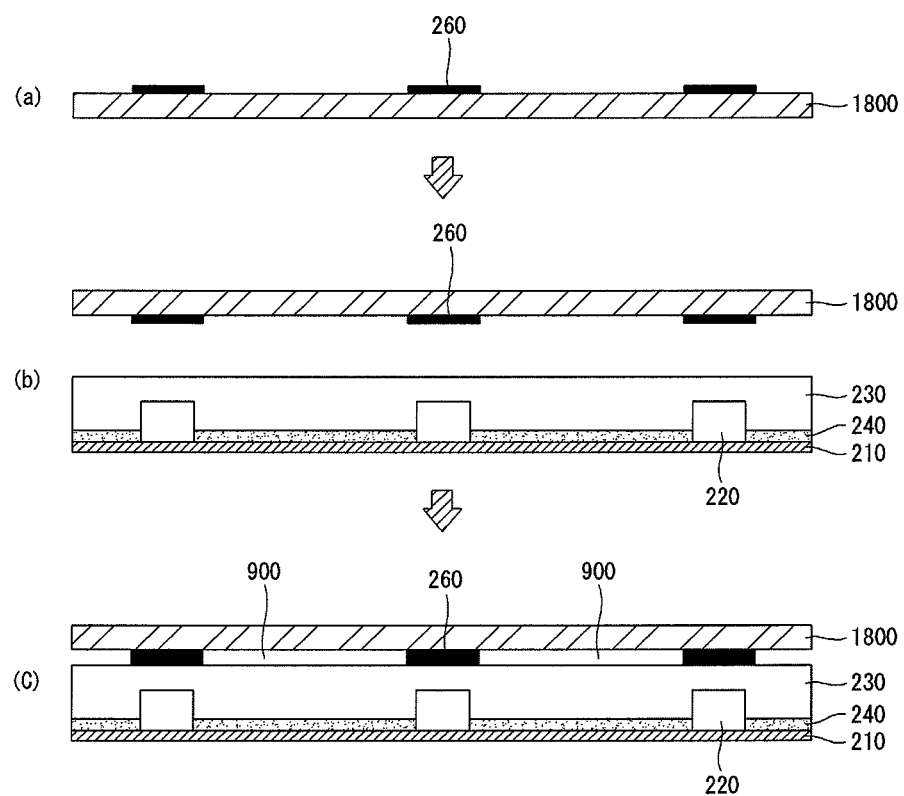

First, as shown in FIG. 9(*a*), the light shielding parts 260 having a predetermined pattern may be printed on one surface of the diffusion plate 1800. For instance, titanium dioxide ($TiO_2$) and a solvent are mixed with each other to manufacture a light shielding ink, the manufactured light shielding ink is directly printed on the surface of the diffusion plate 1800, and the printed light shielding ink is dried to form the predetermined light shielding pattern.

Next, as shown in FIG. 9(*b*), the diffusion plate 1800 on which the light shielding parts 260 are printed or formed may be positioned on the resin layer 230. In the embodiment of the invention, it may be preferable that the diffusion plate 1800 is positioned so that the light shielding parts 260 are positioned at the locations corresponding to the light sources 220. In an example, middle portions of the light shielding parts 260 and the light sources 220 may be aligned with each other.

Next, as shown in FIG. 9(*c*), the diffusion plate 1800 having the light shielding parts 260 may be attached to the resin layer 230. Because each light shielding part 260 has a predetermined height, the light shielding parts 260 have a shape protruding from the surface of the diffusion plate 1800 and may contact the resin layer 230. When the light shielding parts 260 contact the resin layer 230, the diffusion plate 1800 may be firmly fixed to the resin layer 230.

When the resin layer 230 contains a resin material having an adhesion, the diffusion plate 1800 may be firmly attached to the resin layer 230 without using a separate adhesive. Hence, a structural stability of the display device may be sufficiently secured without additionally using an adhesive.

Further, because the light shielding part 260 has the predetermined height, an air Layer 900 may be formed between the diffusion plate 1800 and the resin layer 230. In other words, because the diffusion plate 1800 of the hard plate shape may be positioned on the resin layer 230 and the light shielding part 260 has the predetermined height, the air layer 900 may be formed between the diffusion plate 1800 and the resin layer 230. The air layer 900 may be merely air gaps formed between the diffusion plate 1800 and the resin layer 230.

In this example and in any other examples discussed below, the structure having the diffusion plate 1800 and the light shielding parts 260 (and any other applicable layer) may be combined with the structure having the light sources 220, the substrate 210, the reflection layer 240 and the resin layer 230 via various securing methods (e.g., adhesive, locking mechanism, etc.) which may be used only at edges, corners, sides or limited portions of the backlight unit. As a result, the light shielding parts 260 may contact or be disposed above the light sources 220 without any adhesive or other fixing means at those locations. The light shielding parts 260 may merely lie on the resin layer 230.

A refractive index of the air layer 900 is substantially 1 and may be different from a refractive index of the resin layer 230 and a refractive index of the diffusion plate 1800. Hence, the air layer 900 may efficiently diffuse light emitted from the light sources 220.

As shown ion FIG. 9, when the light shielding parts 260 are formed on the diffusion plate 1800 and then the diffusion plate 1800 having the light shielding parts 260 is positioned on the resin layer 230, the diffusion plate 1800 may be firmly fixed to or may be firmly laid on the resin layer 230 without the separate adhesive because the light shielding parts 260 contact the resin layer 230. Hence, the manufacturing cost of the display device may be reduced while improving the structural stability.

Further, because it is possible to form the light shielding parts 260 on the diffusion plate 1800 separately from a process for forming the resin layer 230 on the substrate 210, a time required to manufacture the display device may be reduced. Further, because the light shielding parts 260 may be printed on the diffusion plate 1800 and then the diffusion plate 1800 is positioned on the resin layer 230, the light shielding parts 260 may be prevented from damaged by a collision between the diffusion plate 1800 and the light shielding parts 260.

Furthermore, because the light shielding parts 260 and the light sources 220 may be aligned or correspond with each other as long as the diffusion plate 1800 having the light shielding parts 260 is positioned on the resin layer 230, the low precision of the manufacturing process may be used. Hence, the manufacturing cost and time required to manufacture the display device may be reduced.

Figure 10:
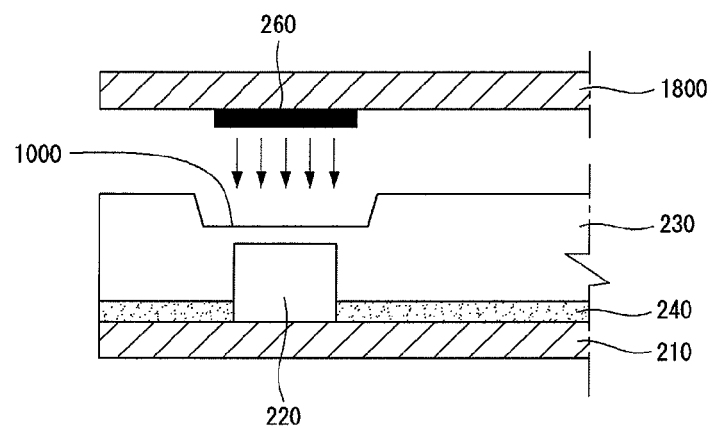

When the diffusion plate 1800 having the light shielding parts 260 is positioned on the resin layer 230, the light shielding parts 260 may be more firmly laid on the resin layer 230 by applying a pressure to the diffusion plate 1800, so that the light shielding parts 260 can be securely attached to the resin layer 230. In this case, as shown in FIG. 10, the light shielding parts 260 may enter into the resin layer 230 by a predetermined depth. For example, a depression 1000 depressed toward the substrate 201 may be formed on the resin layer 230 by pressing the diffusion plate 1800 having the light shielding parts 260 again the resin layer 230, and as a result, the light shielding parts 260 may be positioned inside the depression 1000 without using any adhesive. In this case, the diffusion plate 1800 may be more firmly fixed to the resin layer 230 without the use of an adhesive. In a variation, an adhesive may be used to adhesively attach these layers in addition to applying pressuring against the resin layer 230.

Figure 11:
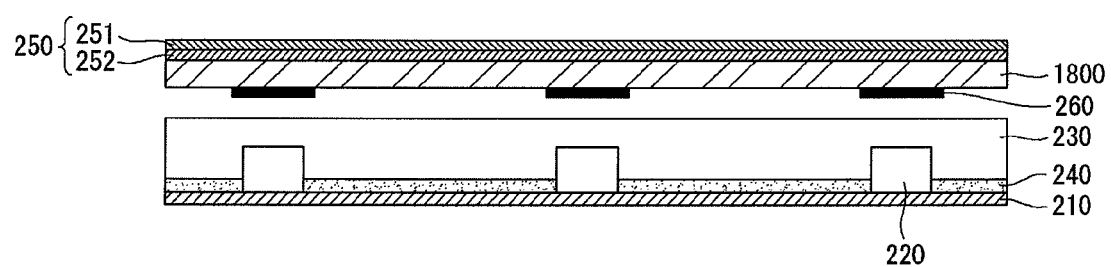

Further, as shown in FIG. 11, an optical sheet 250 may be positioned on the diffusion plate 1800. For example, the optical sheet 250 may include a prism sheet 251 and a diffusion sheet 252. In this case, the prism sheet 251 and the diffusion sheet 252 of the optical sheet 250 are not separated from each other (e.g., may be integrated as one layer) and may be attached to each other or may adhere to each other. Hence, the thickness of the backlight unit 200 may decrease. As discussed above (e.g., in FIGS. 8-10), the diffusion plate 1800 having the optical sheet 250 and the light shielding parts 260 may be disposed on the resin layer 230 with or without an adhesive or other fixing device, whereby air gaps (air layer 900) may be formed between the diffusion plate 1800 and the resin layer 230 which further diffuse the light.

A lower surface of the optical sheet 250 may adhere to the diffusion plate 1800. Although it is not shown, an upper surface of the optical sheet 250 may adhere to the lower surface of the display panel 100, e.g., to the lower polarizing plate.

The diffusion sheet 252 diffuses incident light to prevent a portion of light coming from the diffusion plate 1800 from being concentrated, thereby uniformizing the luminance of light. The prism sheet 251 may focus the light coming from the diffusion sheet 252, thereby allowing the focused light to be incident on the display panel 100 in a direction perpendicular to the display panel 100 or in any other desired direction.

Further, in the optical sheet 250, for example, one of the prism sheet 251 and the diffusion sheet 252 may be removed, and other functional layer(s) may be additionally formed in addition to the optical sheet 250.

Figure 12:
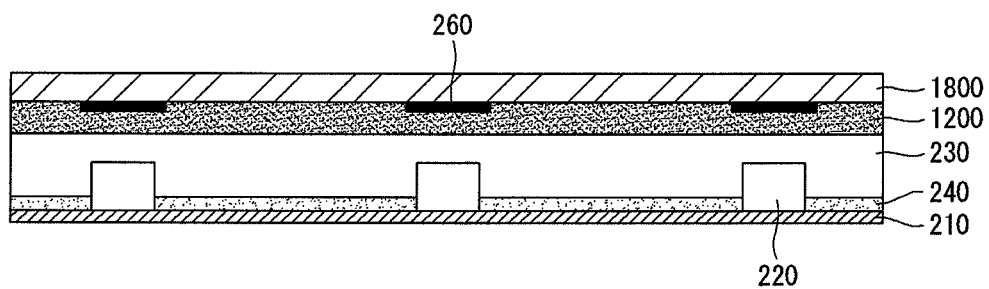

In another examples as shown in FIG. 12, an adhesive layer 1200 may be formed between the diffusion plate 1800 and the resin layer 230. In this case, the adhesive layer 1200 may improve an adhesive strength between the diffusion plate 1800 and the resin layer 230 to thereby further improve the structural stability of the display device.

As above, when the adhesive layer 1200 is formed between the diffusion plate 1800 and the resin layer 230, a small amount of adhesive may be used in the adhesive layer 1200 because the light shielding parts 260 may contact the resin layer 230. Hence, an increase in the manufacturing cost may be suppressed.

It may be preferable that a refractive index of the adhesive layer 1200 is less than the refractive index of the resin layer 230 so as to obtain an effect similar to a formation of the air layer 900 between the diffusion plate 1800 and the resin layer 230. In other circumstances, it may be preferable that the refractive index of the adhesive layer 1200 is greater than the refractive index of the resin layer 230 so that light is easily diffused by reflecting light incident on the adhesive layer 1200 and then again reflecting the reflected light by the reflection layer 240. A balance between these effects can also occur.

In the example of FIG. 12, a thickness of the adhesive layer 1200 at the locations corresponding to the light sources 220 may be less than a thickness of the adhesive layer 1200 at the locations corresponding to areas between the two adjacent light sources 220.

Figure 13:
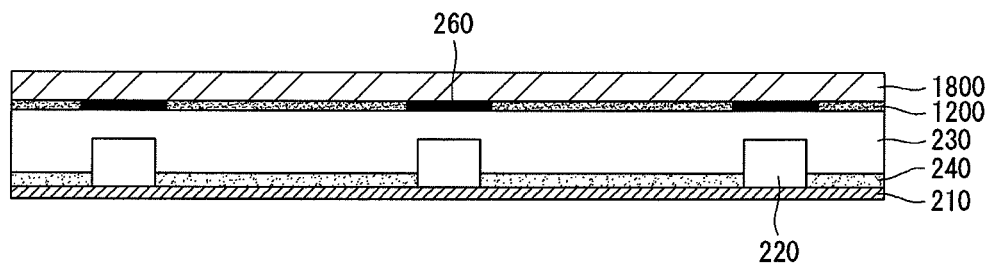

In another example as shown in FIG. 13, the light shielding parts 260 directly contact the resin layer 230, while the adhesive layer 1200 may be formed in areas between the adjacent light shielding parts 260. For instance, the adhesive layer 1200 may not be formed between the light shielding parts 260 and the resin layer 230.

Figure 14:
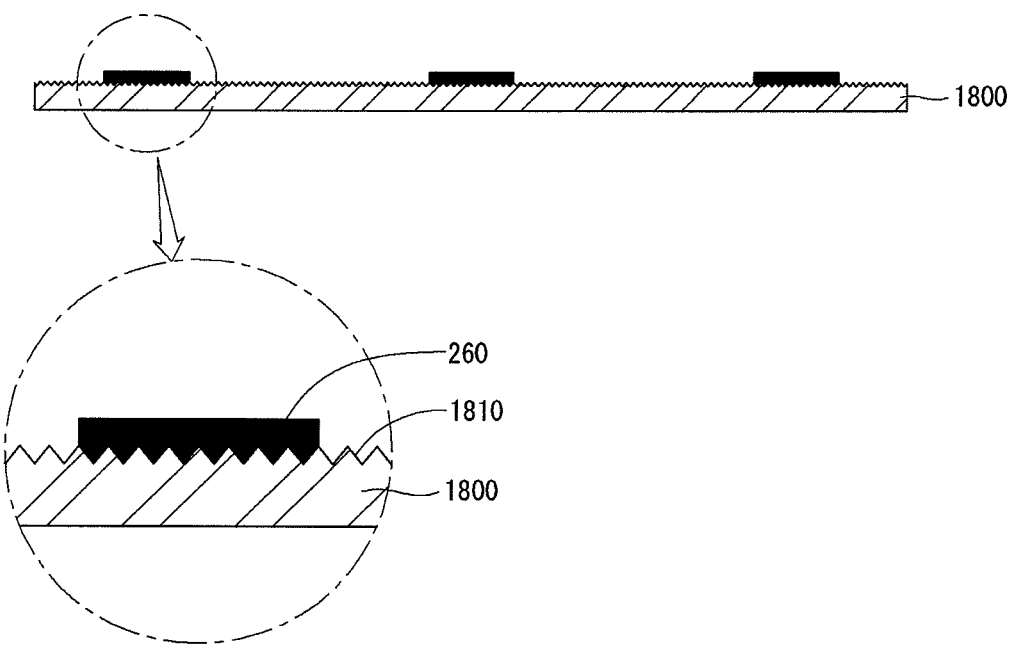

In another example as shown in FIG. 14, a plurality of protrusions 1810 are formed on one surface of the diffusion plate 1800, and the light shielding parts 260 may be formed on the protrusions 1810. The protrusions 1810 may have a pyramid shape or other shape. Further, the protrusions 1810 may be positioned toward the resin layer 230. When viewed from the resin layer 230, the protrusions 1810 may have a reverse pyramid shape. The protruded surface of the diffusion plate 180 faces the resin layer 230.

Figure 15:
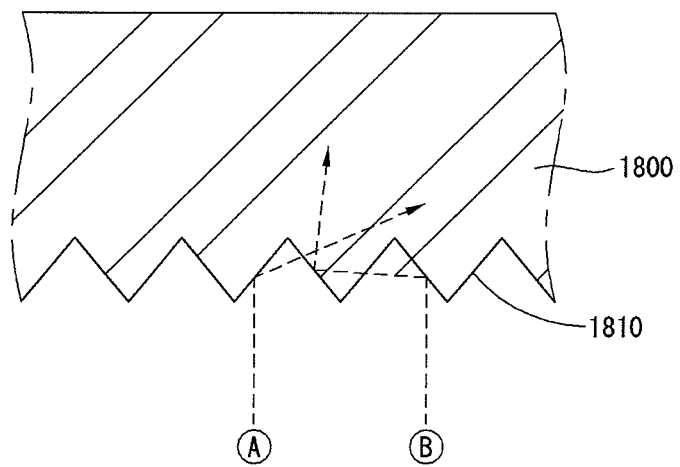

Because light coming from the resin layer 230 is reflected from an inclined surface of the protrusions 1810, the light may be diffused more widely. For example, as shown in FIG. 15, when light is incident through a path "A", light incident on the surface of a specific one of the protrusions 1810 may be reflected. The reflected light may be incident on other protrusion 1810 adjacent to the specific protrusion 1810 at a relatively large angle. Hence, the light incident through the path "A" may be transmitted by the other protrusion 1810 and then may enter into the diffusion plate 1800. Further, light incident through a path "B" may enter into the diffusion plate 1800 through a process similar to the light incident through the path "A". As above, the protrusions 1810 may diffuse more widely light coming from the resin layer 230 and may improve a light diffusion effect.

FIGS. 14 and 15 illustrate the pyramid-shaped protrusions 1810, but other shapes may be used for the protrusions 1810. For example, the protrusions 1810 may have any structure capable of diffusing light coming from the resin layer 230.

Figure 16:
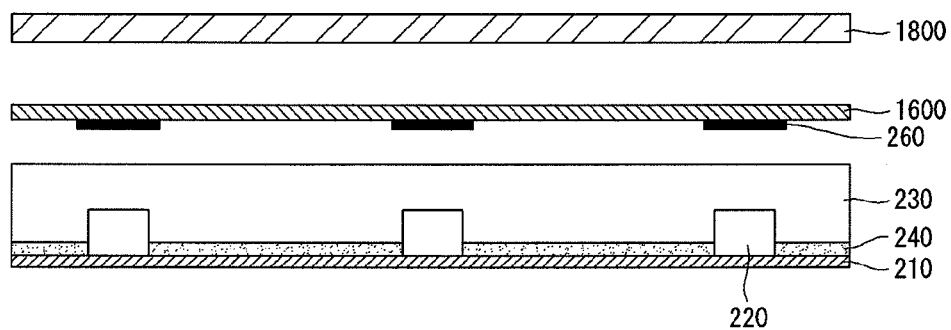

In another example as shown in FIG. 16, an auxiliary layer 1600 having the light shielding parts 260 may be formed between the diffusion plate 1800 and the resin layer 230. The configuration illustrated in FIG. 16 may use a method including forming the light shielding parts 260 on the auxiliary layer 1600 and then disposing the auxiliary layer 1600 having the light shielding parts 260 between the diffusion plate 1800 and the resin layer 230. In an example, the light shielding parts 260 may be printed on the auxiliary layer 1600.

The auxiliary layer 1600 may be formed of a material having the same refractive index as or a refractive index different from the formation material of the resin layer 230. For example, when the auxiliary layer 1600 is formed of a material having a refractive index greater than the formation material of the resin layer 230, the auxiliary layer 1600 may diffuse more widely the light emerging from the resin layer 230. On the contrary, when the auxiliary layer 1600 is formed of a material having a refractive index less than the formation material of the resin layer 230, a reflectance of light reflected from a lower surface of the auxiliary layer 1600 may increase by the light emerging from the resin layer 230. Hence, the light emitted from the light sources 220 may easily travel along the resin layer 230.

The auxiliary layer 1600 may include a plurality of scattering particles, e.g., beads. In this case, a density of the beads of the auxiliary layer 1600 may be greater than a density of beads (if included) in the resin layer 230. As above, when the density of the beads of the auxiliary layer 1600 is greater than the density of the beads included in the resin layer 230, light emitted upward from the resin layer 230 may be diffused more widely.

Further, the auxiliary layer 1600 may have a hard plate in the same manner as the diffusion plate 1800. Even in this case, although it is not shown, the auxiliary layer 1600 may include a plurality of beads or other scattering particles. The auxiliary layer 1600 may scatter incident light using the beads to thereby prevent a concentration of light in a predetermined portion.

The auxiliary layer 1600 may be formed of, e.g., polycarbonate (PC), polymethylmethacrylate (PMMA), and/or cyclic olefin copolymer (COC), etc. Other materials may be used. Further, the auxiliary layer 1600 may be formed of the same material as the diffusion plate 1800.

When the auxiliary layer 1600 is positioned between the diffusion plate 1800 and the resin layer 230, one surface of the auxiliary layer 1600 on which the light shielding parts 260 are formed may be positioned toward the resin layer 230. In other words, when comparing the configuration illustrated in FIG. 16 with the configuration illustrated in FIG. 8, the light shielding parts 260 are formed on the auxiliary layer 1600 instead of the diffusion plate 1800.

Figure 17:
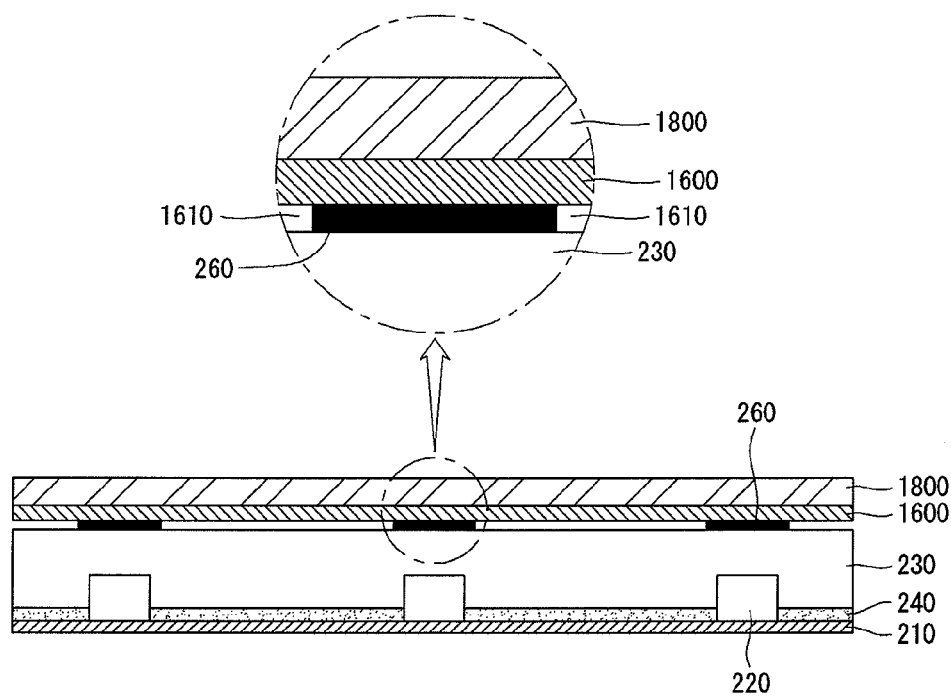

The auxiliary layer 1600 of FIG. 16 then may contact the diffusion plate 1800 as shown in FIG. 17. For example, the auxiliary layer 1600 may be attached to the diffusion plate 1800, and the light shielding parts 260 may be attached to the resin layer 230. Hence, an air layer 1610 may be formed between the auxiliary layer 1600 and the resin layer 230 in a non-formation area of the light shielding parts 260. In other words, the air layer 1610 (e.g., air gaps) may be formed between the two adjacent light shielding parts 260. Here, as mentioned above, an adhesive may not be used between the light shielding parts 260 and the resin layer 230 and/or between the auxiliary layer 1600 and the resin layer 230. The air layer 1610 may efficiently diffuse light emitted from the light sources 220.

Figure 18:
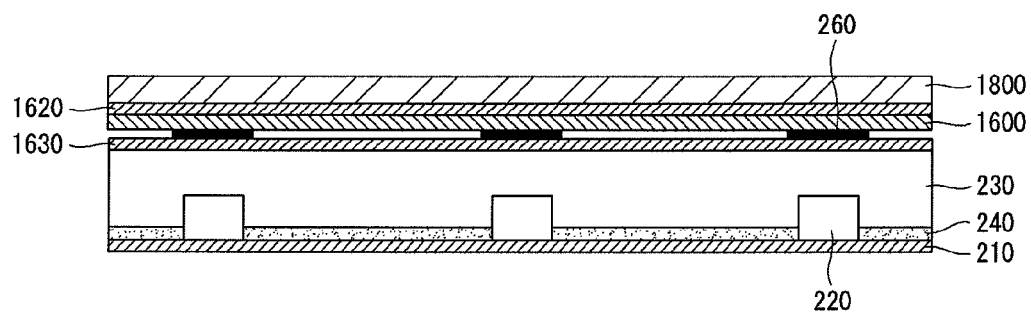

As shown in FIG. 18, a first adhesive layer 1620 may be positioned between the auxiliary layer 1600 and the diffusion plate 1800 so as to attach the auxiliary layer 1600 to the diffusion plate 1800. Further, a second adhesive layer 1630 may be positioned between the light shielding parts 260 and the resin layer 230 so as to attach the light shielding parts 260 to the resin layer 230. Even in this case, the air layer 1610 (e.g., air gaps) may be formed between the auxiliary layer 1600 and the resin layer 230 in a non-formation area of the light shielding parts 260.

Figure 19:
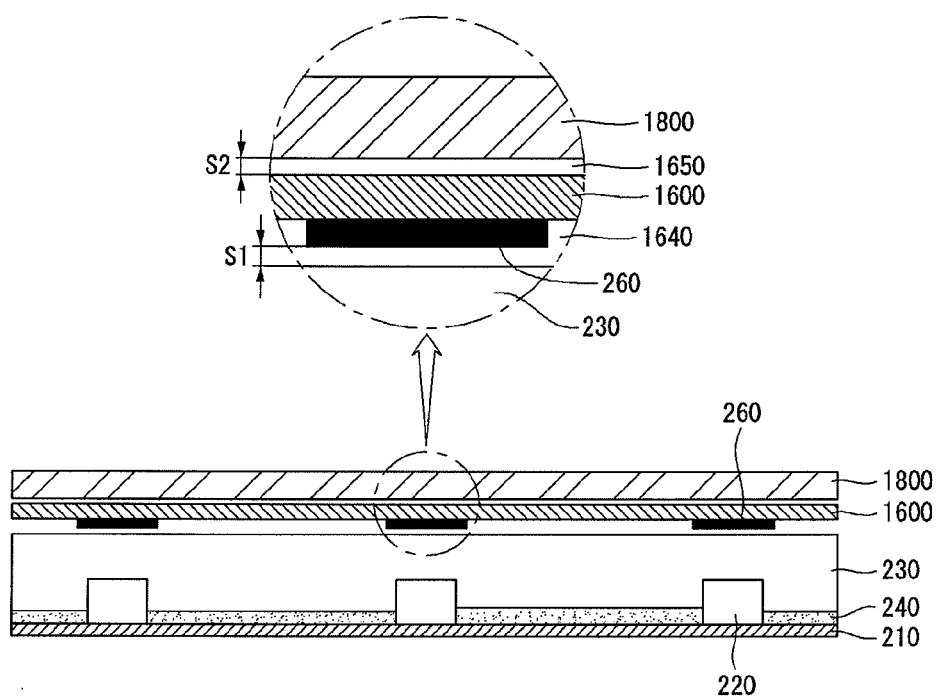

As shown in FIG. 19, the auxiliary layer 1600 may be separated from the diffusion plate 1800 at a predetermined distance S2, and the light shielding parts 260 may be separated from the resin layer 230 at a predetermined distance S1. The distances S1 and S2 may be any value. In this case, a first air layer 1650 (e.g., air gaps) may be formed between the auxiliary layer 1600 and the diffusion plate 1800, and a second air layer 1640 (e.g., air gaps) may be formed between the light shielding parts 260 and the resin layer 230. In a variation, the second air layer 1640 may be positioned between the auxiliary layer 1600 and the resin layer 230 as well as between the light shielding parts 260 and the resin layer 230, or may be formed only between the auxiliary layer 1600 (where the light shielding parts are not formed) and the resin layer 230 but not between the light shielding parts 260 and the resin layer 230.

When the auxiliary layer 1600 is separated from the diffusion plate 1800 at the predetermined distance S2, the auxiliary layer 1600, the resin layer 230, and the substrate 210 may be prevented from being bent even if the diffusion plate 1800 is bent because of changes in a temperature. In other words, even if the diffusion plate 1800 is bent, the bending of the backlight unit may be prevented. Hence, the structural stability of the backlight unit may increase, and a reduction in optical characteristics of the backlight unit may be prevented.

When the first air layer 1650 is formed between the auxiliary layer 1600 and the diffusion plate 1800, the first air layer 1650 may diffuse light transmitted by the auxiliary layer 1600. Hence, light distribution may be more uniform. Further, because the second air layer 1640 between the light shielding parts 260 and the resin layer 230 may diffuse light, the light distribution may be more uniform.

As shown in FIG. 19, the diffusion plate 1800 may be set on the auxiliary layer 1600 so as to form the first air layer 1650 between the auxiliary layer 1600 and the diffusion plate 1800. In this case, a direct attachment between the auxiliary layer 1600 and the diffusion plate 1800 is not provided by forming the auxiliary layer 1600 and the diffusion plate 1800 using a material not having an adhesion. Hence, the first air layer 1650 may be naturally formed between the auxiliary layer 1600 and the diffusion plate 1800.

Further, the auxiliary layer 1600 on which the light shielding parts 260 are formed may be set on the resin layer 230 so as to form the second air layer 1640 between the resin layer 230 and the auxiliary layer 1600 having the light shielding parts 260. In this case, a direct attachment between the resin layer 230 and the light shielding parts 260 is not provided by forming the resin layer 230 and the light shielding parts 260 using a material not having an adhesion. Hence, the second air layer 1640 may be naturally formed between the resin layer 230 and the light shielding parts 260. As discussed above, the diffusion plate 1800 and/or the auxiliary layer 1600 having the light shielding parts 230 may be attached or disposed above the corresponding structure without using an adhesive or other fixing layer. For instance, these layers may be laid above the corresponding structure.

Figure 20:
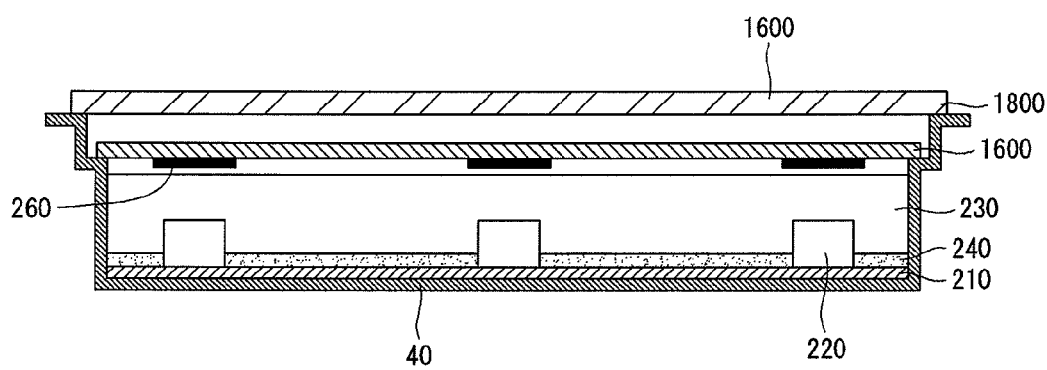

As shown in FIG. 20, a portion capable of safely setting the auxiliary layer 1600 and a portion capable of safely setting the diffusion plate 1800 may be provided in the back cover 40 as shown in FIG. 1. In this case, the first air layer 1650 (air gap) may be formed between the auxiliary layer 1600 and the diffusion plate 1800 by the back cover 40, and the second air layer 1640 (air gap) may be formed between the auxiliary layer 1600 having the light shielding parts 260 and the resin layer 230 by the back cover 40.

Figure 21:
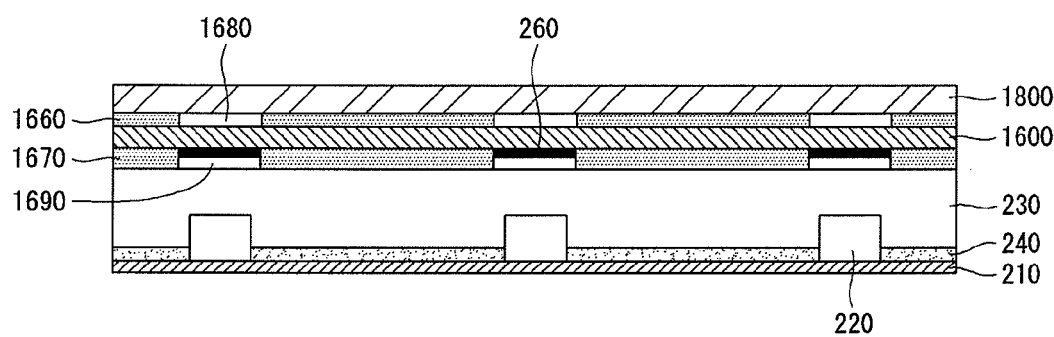

In another variation as shown in FIG. 21, an adhesive layer may be partially formed between the auxiliary layer 1600 and the diffusion plate 1800, and an adhesive layer may be partially formed between the auxiliary layer 1600 having the light shielding parts 260 and the resin layer 230.

For example, a third adhesive layer 1670 may be formed between the adjacent light shielding parts 260 in an area between the auxiliary layer 1600 having the light shielding parts 260 and the resin layer 230. The third adhesive layer 1670 may be omitted between the light shielding parts 260 and the resin layer 230. In this case, a third air layer 1690 (e.g., air gaps) may be formed between the light shielding parts 260 and the resin layer 230 as shown.

In addition or in the alternative, a fourth adhesive layer 1660 may be formed in an area between the auxiliary layer 1600 and the diffusion plate 1800 that does not overlap or is not above the light shielding parts 260. The fourth adhesive layer 1660 may be omitted in an area between the auxiliary layer 1600 and the diffusion plate 1800 that overlaps or is above the light shielding parts 260. In this case, a fourth air layer 1680 may be formed in an area between the auxiliary layer 1600 and the diffusion plate 1800 that overlaps (or is above) the light shielding parts 260.

FIGS. 22 to 30 illustrate in detail various examples of the light shielding part according to an embodiment of the invention. FIGS. 22 to 25 illustrate examples of the light shielding part which may be used with the top-view type light source, and FIGS. 26 to 30 illustrate examples of the light shielding part which may be used with the side-view type light source. However, the examples of FIGS. 22-30 may be used in other types of light sources. Further, one light shielding part 260 may be discussed herein, but these features are applicable to each of the plurality of light shielding parts 260.

Figure 22:
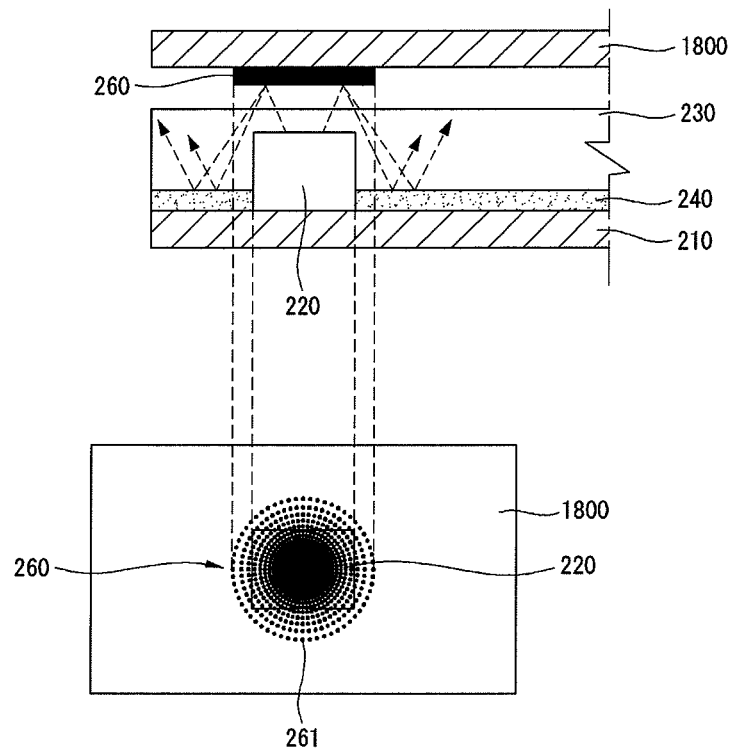
FIGS. 22 to 30 illustrate examples of a light shielding part according to an embodiment of the invention.

As shown in FIG. 22, the light shielding part 260 may be positioned at a location corresponding to the light source 220.

A portion of light emitted from the light source 220 may be reflected by the light shielding part 260 and then may be diffused in a lateral direction. More specifically, light emitted upward from the light source 220 is diffused by the light shielding part 260 in a lateral direction, and at the same time is reflected in a downward direction. Hence, the light may reach the reflection layer 240. The light reaching the reflection layer 240 is again reflected by the reflection layer 240 and then is reflected in the lateral and upward directions. The light emitted from the light source 220 is not concentrated in an upper area of the light source 220 and may be widely diffused in a lateral direction. As a result, the backlight unit may provide light with the uniform luminance.

Further, the light shielding part 260 may be configured by a plurality of dots 261. More specifically, a pattern comprised of the plurality of dots 261 may be formed on one surface of the diffusion plate 1800 to form the light shielding part 260. In an example, the light shielding part 260 may have a circular shape as shown but can be different shapes, e.g., rectangular, oval, etc.

In this case, the light shielding part 260 may include a portion where a density of the dots 261 decreases in an outwardly direction. For instance, the number (i.e., the density) of dots 261 per the unit area in a first area of the light shielding part 260 corresponding to the light source 220 may be greater than the number (i.e., the density) of dots 261 per the unit area in a second area of the light shielding part 260 that is adjacent to the first area but more outwardly disposed than the first area. In this case, a light transmittance of the first area is less than a light transmittance of the second area because an intensity of light reaching the first area is greater than an intensity of light reaching the second area. Hence, the light emitted from the light source 220 may be diffused more efficiently.

Figure 23:
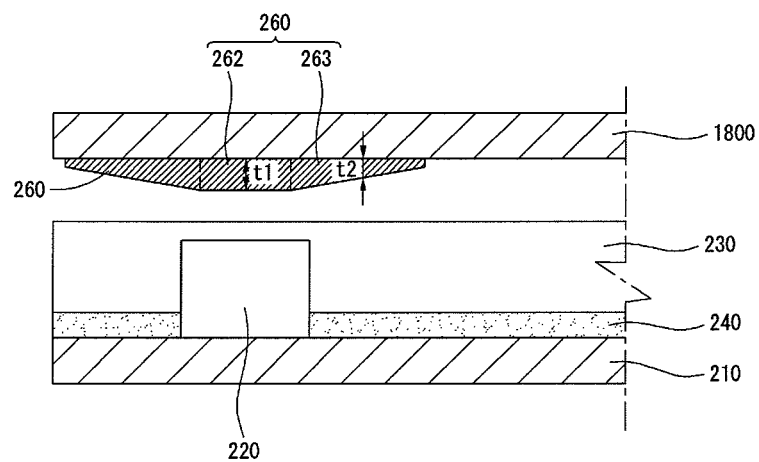

As shown in FIG. 23 as a variation, the light shielding part 260 may include a portion where a thickness of the portion decreases as the light shielding part 260 extends outwardly. In other words, a thickness t1 of a third area 262 of the light shielding part 260 corresponding to the light source 220 may be greater than a thickness t2 of a fourth area 263 of the light shielding part 260 that is further away from the light source 220 by a predetermined distance. Even in this case, a light transmittance of the third area 262 is less than a light transmittance of the fourth area 263 because an intensity of light reaching the third area 262 is greater than an intensity of light reaching the fourth area 263. Hence, the light emitted from the light source 220 may be diffused more efficiently. Here, the light shielding part 260 can be in any shape such as circular shape, rectangular shape, oval shape, etc.

Figure 24:
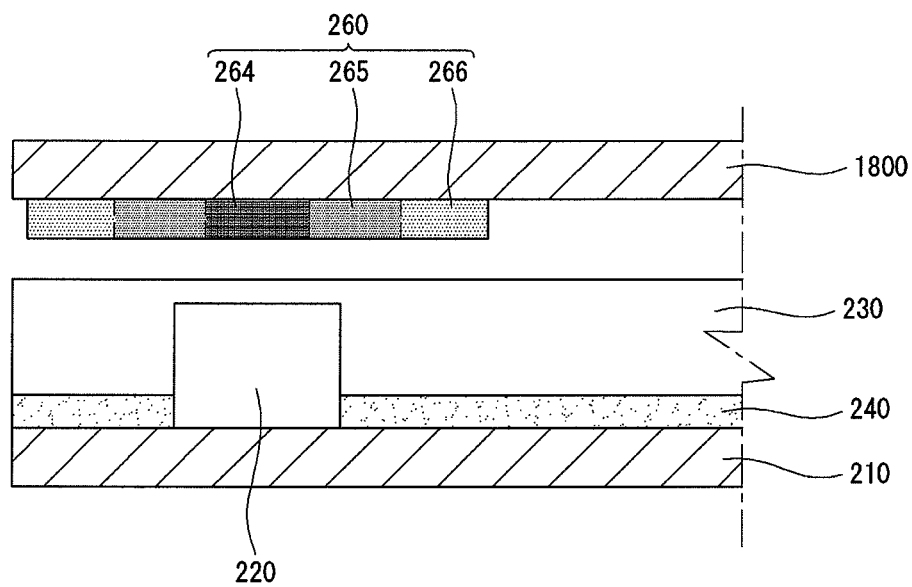

As shown in FIG. 24 in another variation, the light shielding part 260 may include a portion where a transparency of the portion increases as the light shielding part 260 extends outwardly. In other words, a transparency of a fifth area 264 of the light shielding part 260 corresponding to the light source 220 may be less than a transparency of a sixth area 265 of the light shielding part 260 adjacent to the fifth area 264, and the transparency of the sixth area 265 may be less than a transparency of a seventh area 266 of the light shielding part 260 adjacent to the sixth area 265. Even in this case, a light transmittance of the fifth area 264 is less than a light transmittance of the sixth area 265 because an intensity of light reaching the fifth area 264 is greater than an intensity of light reaching the sixth area 265, and a light transmittance of the sixth area 265 is less than a light transmittance of the seventh area 266 because an intensity of light reaching the sixth area 265 is greater than an intensity of light reaching the seventh area 266. Hence, the light emitted from the light source 220 may be diffused more efficiently. The light shielding part 260 can be in any shape such as circular shape, rectangular shape, oval shape, etc.

Figure 25:
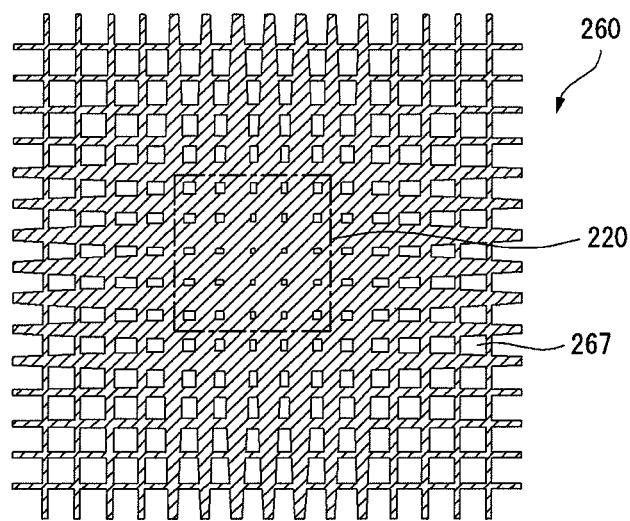

As shown in FIG. 25 in a variation, the light shielding part 260 includes a plurality of holes 267 and also may include a portion where the size of each hole 267 increases as the light shielding part 260 extends outwardly. For instance, an aperture ratio of an eighth area of the light shielding part 260 corresponding to the light source 220 may be less than an aperture ratio of a ninth area of the light shielding part 260 that is further away from the light source 220 by a predetermined distance. Even in this case, a light transmittance of the eighth area is less than a light transmittance of the ninth area because an intensity of light reaching the eighth area is greater than an intensity of light reaching the ninth area. Hence, the light emitted from the light source 220 may be diffused more efficiently. The light shielding part 260 can be in any shape such as circular shape, rectangular shape, oval shape, etc.

Figure 26:
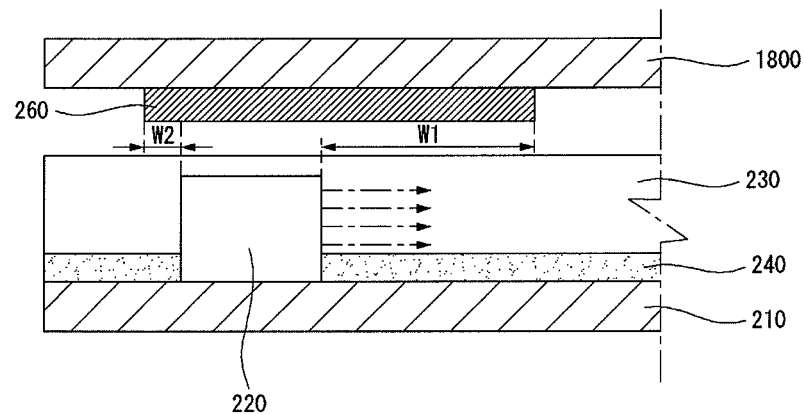

FIG. 26 illustrates an example of a side-view type light source that emits light in a lateral direction. For example, if a light emitting surface of the light source 220 is referred to as a front surface of the light source 220, a luminance of the front surface of the light source 220 may be greater than a luminance of a back surface (opposite the front surface) of the light source 220. Accordingly, it may be preferable that the light shielding part 260 is positioned to be inclined to or off-centered towards the front surface of the light source 220. For example, the light shielding part 260 includes a first portion extending from the light source 220 in a front direction of the light source 220 and a second portion extending from the light source 220 in a back direction of the light source 220. A length W1 of the first portion may be greater than a length W2 of the second portion. The light shielding part 260 can be in any shape such as circular shape, rectangular shape, oval shape, etc.

In another example, the light shielding part 260 may not be formed on the back surface of the light source 220. For instance, the end of the lights shielding part 260 may be aligned with the back surface of the light source 220. Even in this case, light emitted from the light source 220 may be prevented from being concentrated in a predetermined portion.

Figure 27:
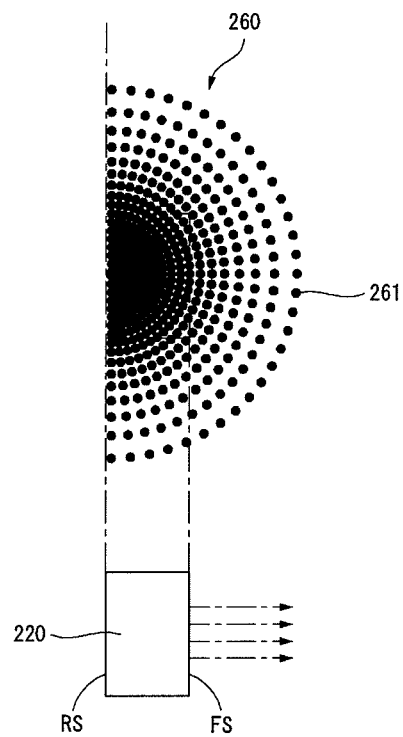

As shown in FIG. 27 in an example, when the light source 220 is a side-view type light source, the light shielding part 260 may include a plurality of dots 261. In one case, the number (i.e., a density) of dots 261 per the unit area corresponding to a front surface FS of the light source 220 may be greater than the number (i.e., a density) of dots 261 per the unit area corresponding to a back surface RS of the light source 220. In another case, the density of the dots 261 may decrease in the light emitting direction of the light source 220.

In one example, the number (i.e., the density) of dots 261 per the unit area in a 10th area separated from the front surface FS of the light source 220 by a first distance may be greater than the number (i.e., the density) of dots 261 per the unit area in a 20th area separated from the front surface FS of the light source 220 by a second distance greater than the first distance. Even in this case, the light emitted from the light source 220 may be prevented from being concentrated in a predetermined portion.

Figure 28:
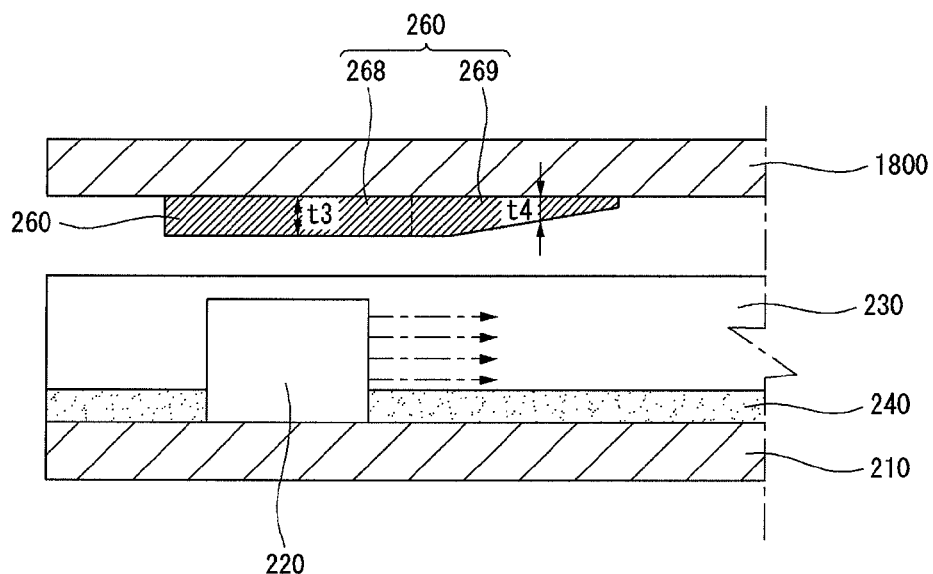

As shown in FIG. 28 as a variation, the light shielding part 260 may include a portion where the density of the dots 261 decreases in the light emitting direction of the light source. This decrease may be gradual or may be stepped. For instance, a thickness t3 of an area 268 of the light shielding part 260 corresponding to the light source 220 may be greater than a thickness t4 of an area 269 that is separated from (or corresponds to an area in front of) the front surface of the light source 220 by a predetermined distance. Even in this case, the light emitted from the light source 220 may be prevented from being concentrated in a predetermined portion. The light shielding part 260 can be in any shape such as circular shape, rectangular shape, oval shape, etc.

Figure 29:
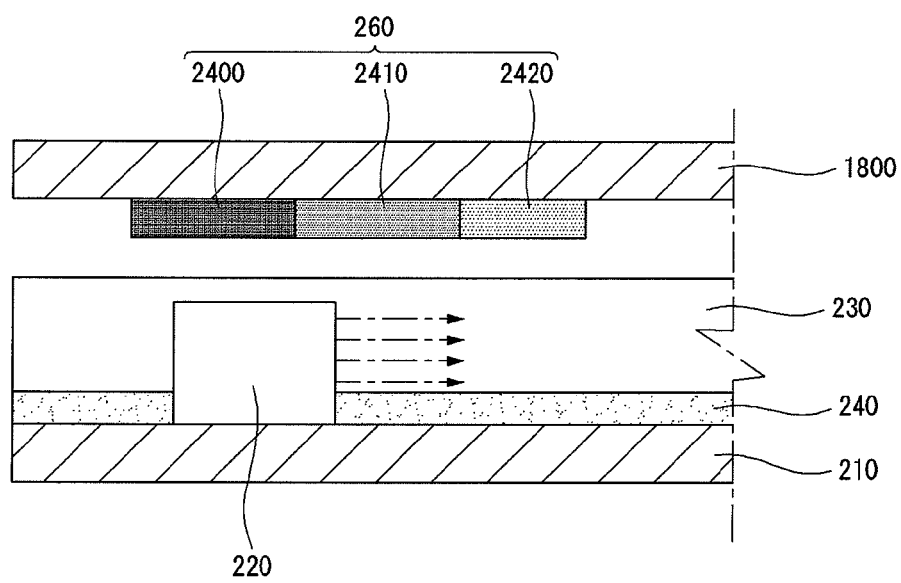

As shown in FIG. 29 as another variation, the light shielding part 260 may include a portion where a transparency of the portion in the light emitting direction (represented by the arrows) of the light source 220. For example, a transparency of a first area 2400 of the light shielding part 260 corresponding to the light source 220 may be less than a transparency of a second area 2410 adjacent to the first area 2400, and the transparency of the second area 2410 may be less than a transparency of a third area 2420 adjacent to the second area 2410. Even in this case, the light emitted from the light source 220 may be prevented from being concentrated in a predetermined portion. The light shielding part 260 can be in any shape such as circular shape, rectangular shape, oval shape, etc.

Figure 30:
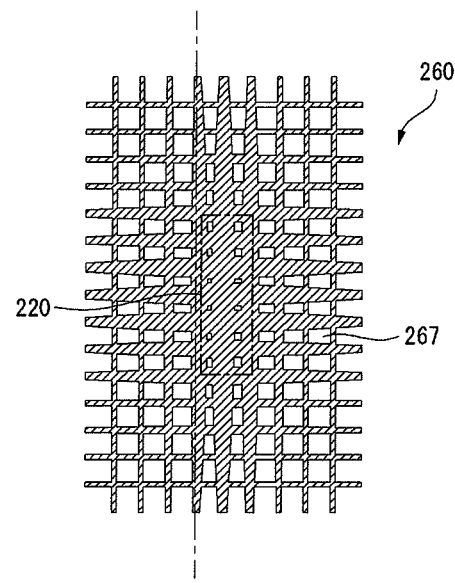

As shown in FIG. 30 as a variation, the light shielding part 260 includes a plurality of holes 267 and also may include a portion where the size of each hole 267 increases in the outwardly direction. For instance, an aperture ratio of a first area corresponding to the light source 220 may be less than an aperture ratio of a second area that is separated from the front surface of the light source 220 by a predetermined distance. Even in this case, the light emitted from the light source 220 may be prevented from being concentrated in a predetermined portion. The light shielding part 260 can be in any shape such as circular shape, rectangular shape, oval shape, etc.

In the above, when the light shielding part 260 or the layer having the light shielding part 260 is fixed to the diffusion plate 1800 or other layer by an adhesive, the light may transmit therethrough which may contribute to generation of hot spots. The examples of the invention address this by providing these layers without the use or an adhesive material. For instance, the light shielding part 260 or the layer having the light shielding part 260 may lay on the diffusion plate 1800 or other applicable layer (where no adhesive is used), which create air gaps therebetween which in turn help with the light reflection and the reduction/elimination of the hot spots.

FIGS. 31 to 35 illustrate examples of an arrangement structure of the light sources of the backlight unit according to an exemplary embodiment of the invention. In these examples, the various configurations of the light sources and the backlight unit discussed above can be used.

Figure 31:
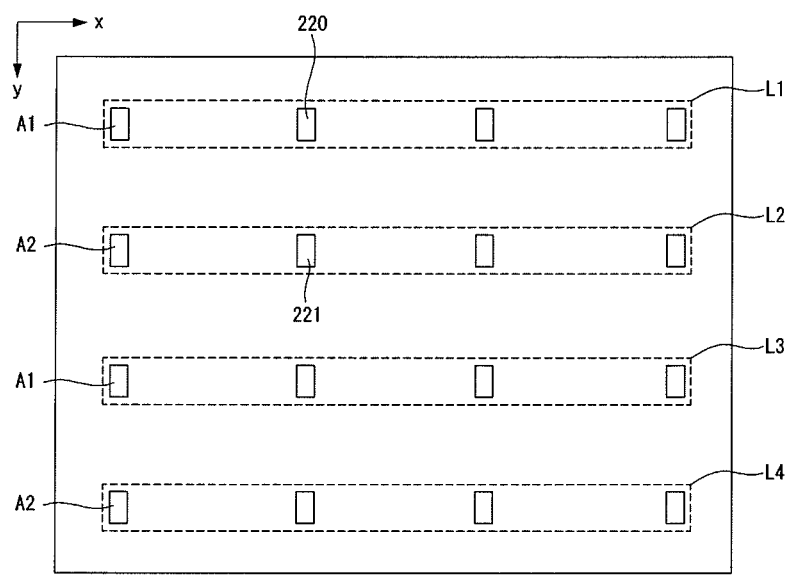
FIGS. 31 to 35 illustrate examples of an arrangement structure of light sources of a backlight unit according to an exemplary embodiment of the invention.

As shown in FIG. 31, the plurality of light sources 220 and 221 of the backlight unit 200 may be divided into a plurality of arrays, for example, a first light source array A1 and a second light source array A2.

Each of the first light source array A1 and the second light source array A2 may include a plurality of light source lines each including light sources. For example, the first light source array A1 may include a plurality of light source lines L1 each including at least two light sources, and the second light source array A2 may include a plurality of light source lines L2 each including at least two light sources The plurality of light source lines L1 of the first light source array A1 and the plurality of light source lines L2 of the second light source array A2 may be alternately disposed so as to correspond to the display area of the display panel 100.

In the embodiment of the invention, the first light source array A1 may include odd-numbered light source lines each including at least two light sources from the top of the plurality of light source lines, and the second light source array A2 may include even-numbered light source lines each including at least two light sources from the top of the plurality of light source lines.

In the embodiment of the invention, the backlight unit 200 may be configured so that a first light source line L1 of the first light source array A1 and a second light source line L2 of the second light source array A2 are disposed adjacent to each other up and down and the first light source line L1 and the second light source line L2 are alternately disposed.

Further, the light source 220 of the first light source array A1 and the light source 221 of the second light source array A2 may emit light in the same direction or in different directions (e.g., opposite directions). The light sources 220 may be generally aligned in a matrix configuration.

Figure 32:
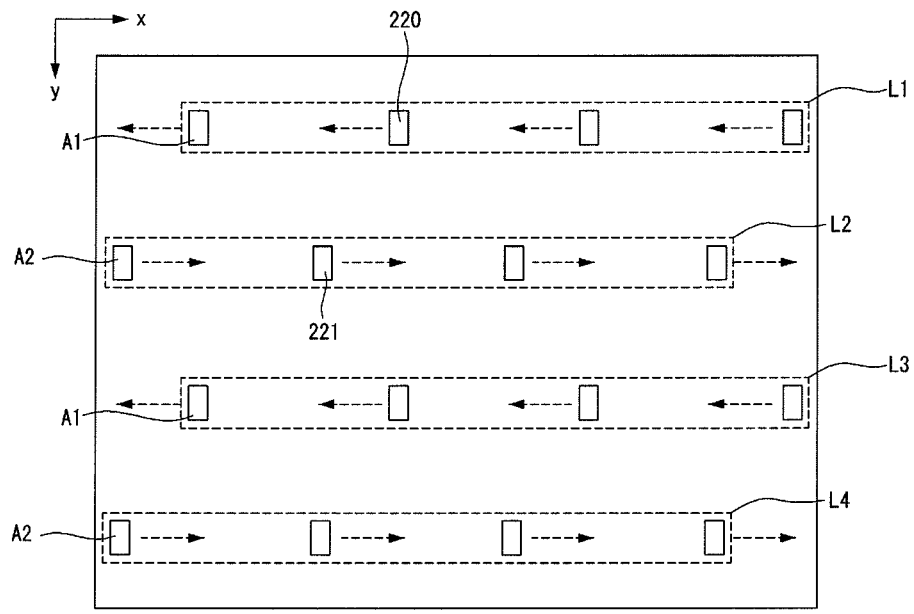

As shown in FIG. 32 in a variation, the backlight unit 200 may include two or more light sources that emit light in different directions where the light sources may be staggered.

For instance, the light sources 220 of the first light source array A1 and the light sources 221 of the second light source array A2 may emit light in different directions, e.g., opposite direction. For this, a facing direction of light emitting surfaces of the light sources 220 of the first light source array A1 may be different from a facing direction of light emitting surfaces of the light sources 221 of the second light source array A2.

In one example, the light emitting surface of the first light source 220 of the first light source array A1 and the light emitting surface of the second light source 221 of the second light source array A2 may face in opposite directions. Hence, the first light source 220 of the first light source array A1 and the second light source 221 of the second light source array A2 may emit light in opposite directions. In this case, each of the light sources of the backlight unit 200 may emit light in the lateral direction and may be configured by using the side view-type LED package.

The plurality of light sources of the backlight unit 200 may be disposed while forming two or more lines. Two or more light sources on the same line may emit light in the same direction. For example, light sources adjacent to right and left sides of the first light source 220 may emit light in the same direction as the first light source 220, i.e., in the opposite direction of an x-axis direction. Light sources adjacent to right and left sides of the second light source 221 may emit light in the same direction as the second light source 221, i.e., in the x-axis direction.

As described above, the light sources (for example, the first light source 220 and the second light source 221) disposed adjacent to each other in a y-axis direction may be configured so that their light emitting direction are opposite to each other. Hence, the luminance of light emitted from the light sources may be prevented from being increased or reduced in a predetermined area of the backlight unit 200.

That is, as light emitted from the first light source 220 travels toward the light source adjacent to the first light source 220, a luminance of light may be reduced. As a result, as a distance between the first light source 220 and an area distant from the first light source 220 increases, a luminance of light emitted from the distant area in a direction of the display panel 100 may be reduced.

Accordingly, because the first light source 220 and the second light source 221 emit light in the opposite directions in the embodiment of the invention, a luminance of light emitted from the first light source 220 and the second light source 221 may be complementarily prevented from increasing in the area adjacent to the light source and from being reduced in the area distant from the light source. Hence, the luminance of light provided by the backlight unit 200 may be uniformized.

Further, the light sources of the first light source line L1 of the first light source array A1 and the light sources of the second light source line L2 of the second light source array A2 may not disposed in the straight line in a vertical direction and may be staggered in the vertical direction. As a result, the uniformity of light emitted from the backlight unit 200 may be improved. For example, the first light source 220 of the first light source array A1 and the second light source 221 of the second light source array A2 may be disposed adjacent to each other in a diagonal direction.

Figure 33:
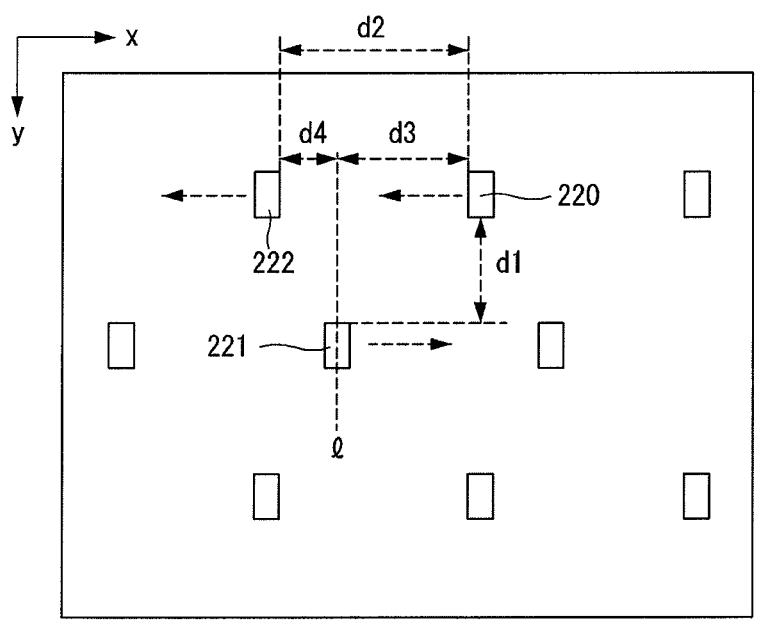

As shown in FIG. 33, two vertically adjacent light source lines (for example, the first and second light source lines L1 and L2) respectively included in the first and second light source arrays A1 and A2 may be separated from each other by a predetermined distance d1. In other words, the first light source 220 of the first light source array A1 and the second light source 221 of the second light source array A2 may be separated from each other by the predetermined distance d1 based on the y-axis direction perpendicular to the x-axis being a light emitting direction.

As the distance d1 between the first and second light source lines L1 and L2 increases, an area where light emitted from the first light source 220 or the second light source 221 cannot reach may be generated. Thus, the luminance of light in the non-reach area of light may be reduced. On the other hand, as the distance d1 between the first and second light source lines L1 and L2 decreases, the light emitted from the first light source 220 and the light emitted from the second light source 221 may interfere with each other. In this case, the division driving efficiency of the light sources may be deteriorated.

Accordingly, the distance d1 between the adjacent light source lines (for example, the first and second light source lines L1 and L2) in a crossing direction of the light emitting direction may be approximately 5 mm to 22 mm, so as to uniformize the luminance of light provided by the backlight unit 200 while reducing the interference between the light sources.

Further, the third light source 222 included in the first light source line L1 of the first light source array A1 may be disposed adjacent to the first light source 220 in the light emitting direction. The first light source 220 and the third light source 222 may be separated from each other by a predetermined distance d2.

The distance d2 between two adjacent light sources (for example, the first and third light sources 220 and 222) in the light emitting direction may be approximately 9 mm to 27 mm, so as to uniformize the luminance of light provided by the backlight unit 200 while reducing the interference between the light sources. Here, the distance d2 may be measured to be the distance between the surfaces of the light sources 220 and 22 that face each other as shown in FIG. 33 or may be measured from the back surface (non-light emitting surface) of the third light source 222 to the back surface (non-light emitting surface) of the first light source 220.

The second light source 221 of the second light source array A2 may be disposed in an area corresponding to an area between the adjacent first and third light sources 220 and 222 included in the first light source array A1. For instance, the second light source 221 may be disposed adjacent to the first light source 220 and the third light source 222 in the y-axis direction and may be disposed on a straight line l passing between the first light source 220 and the third light source 222. In this case, a distance d3 between the straight line l on which the second light source 221 is disposed and the first light source 220 may be greater than a distance d4 between the straight line l and the third light source 222.

Light emitted from the second light source 221 travels in the opposite direction to a light emitting direction of the third light source 222, and thus the luminance of light emitted toward the display panel 100 may be reduced in an area adjacent to the third light source 222.

Accordingly, in the embodiment of the invention, because the second light source 221 is disposed closer to the third light source 222 than to the first light source 220, the reduction in the luminance of light in the area adjacent to the third light source 222 may be compensated using an increase in the luminance of light in the area adjacent to the second light source 221.

Figure 34:
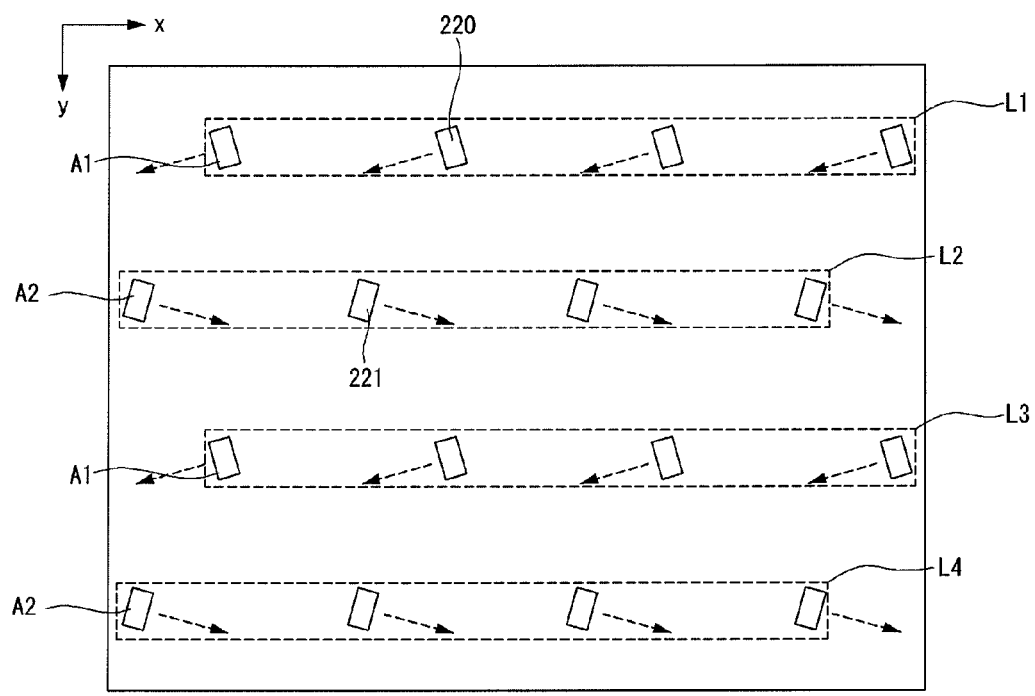

In a variation, at least one of the plurality of light sources 220 of the backlight unit 200 may emit light in a general horizontal direction, e.g., in a direction slightly inclined to the x-axis direction. For example, as shown in FIG. 34, facing directions of the light emitting surfaces of the light sources 220 and 221 may be upwardly or downwardly inclined to the x-axis direction by a predetermined angle.

Figure 35:
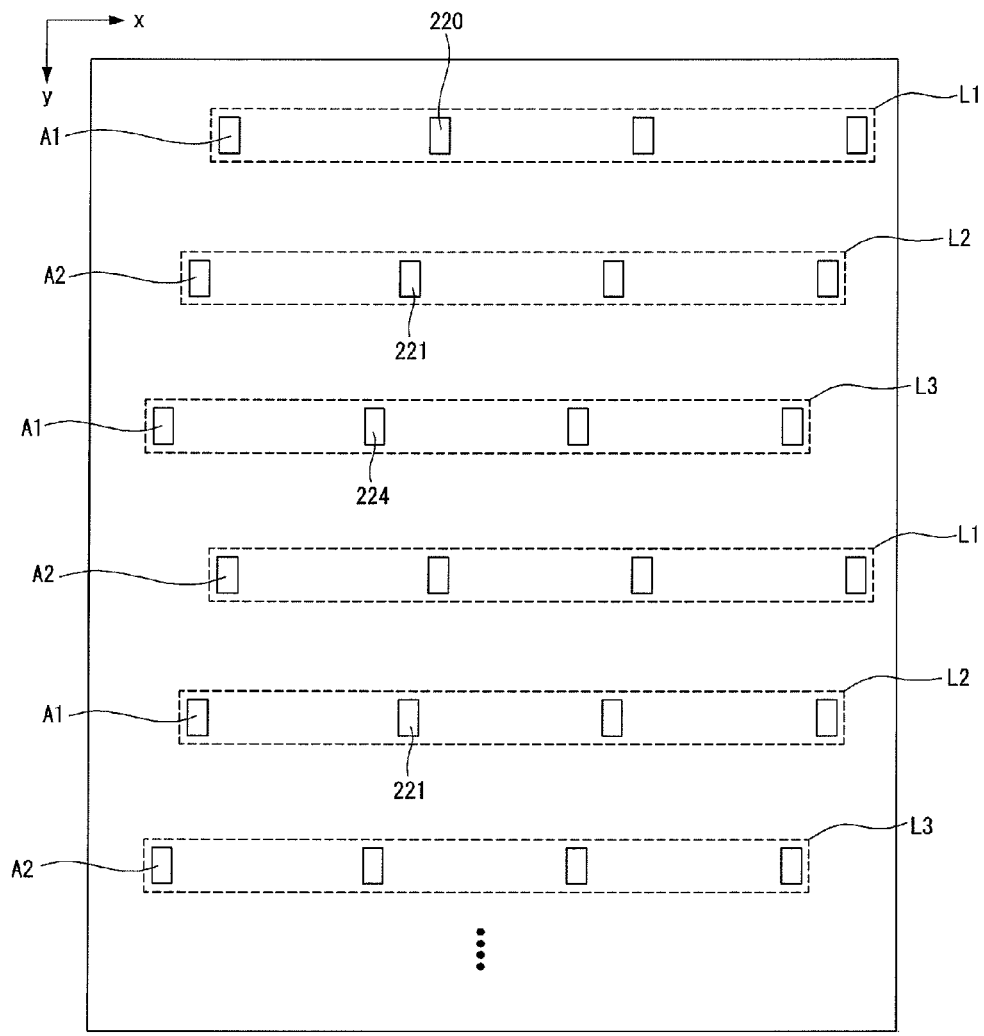

As shown in FIG. 35 in another variation, the light sources 220, 221, and 224 respectively included in the light source lines L1, L2, and L3 may be staggered. For example, the light sources included in the light source lines L1, L3, and L2 of the first light source array A1 and the light sources included in the light source lines L2, L1, and L3 of the second light source array A2 may be staggered. Hence, the light source lines L1, L3, and L2 of the first light source array A1 and the light source lines L2, L1, and L3 of the second light source array A2 may be alternately disposed. The light sources 220, 221, 222, and 224 may be the same type of light sources. However, the light sources 220, 221, 222, and 224 may emit light in different directions or may be different types of light sources, if desired.

Figure 36:
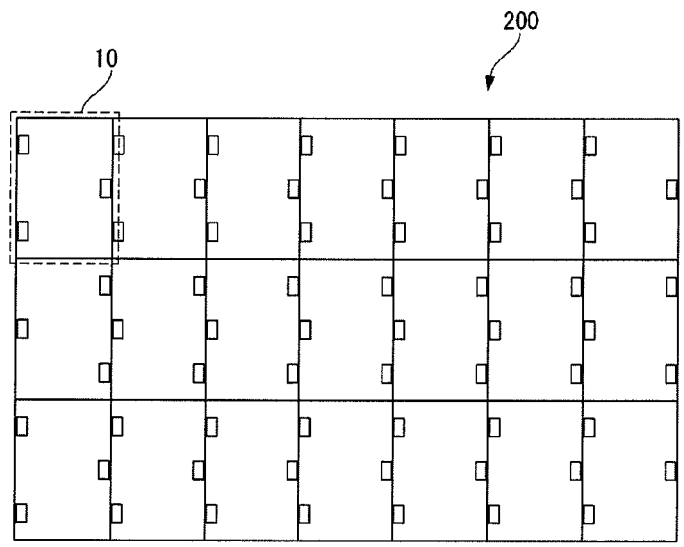
FIG. 36 illustrates a structure of a unit substrate according to an embodiment of the invention.

FIG. 36 illustrates a structure of a unit substrate according to an embodiment of the invention.

As shown in FIG. 36, the backlight unit 200 is divided into a plurality of optical assemblies 10, where each assembly 10 can have any configuration of the backlight unit and/or light source discussed above. For instance, the substrate 210, the plurality of light sources 220 formed on the substrate 210, the resin layer 230 covering the plurality of light sources 220, the reflection layer 240 formed on the substrate 210, and the plurality of diffusion patterns 241 positioned on the reflection layer 240 that are described in detail above may constitute one optical assembly 10, may be referred to as a unit substrate. The backlight unit 200 may be configured by disposing the plurality of optical assemblies 10.

The plurality of optical assemblies 10 included in the backlight unit 200 may be arranged in N by M matrix form in the x-axis and y-axis directions, where N and M are a natural number equal to or greater than 1.

As shown in FIG. 36, 21 optical assemblies 10 of the backlight unit 200 may be arranged in 7×3 matrix. However, since the assembly arrangement shown in FIG. 36 is just one example for describing the backlight unit according to the embodiment of the invention, the embodiment of the invention is not limited thereto. The arrangement of the optical assemblies 10 may be changed depending on the screen size of the display device, etc. For example, in case of a 47-inch display device, the backlight unit 200 may be configured by arranging 240 optical assemblies 10 in 24×10 matrix.

Each of the optical assemblies 10 may be manufactured as an independent assembly, and the optical assemblies 10 may be disposed adjacent to one another to form a module-type backlight unit. The module-type backlight unit serving as backlight means may provide light to the display panel 100.

As described above, the backlight unit 200 may be driven in a full driving manner such as global dimming or a partial driving manner such as local dimming and impulsive driving. The backlight unit 200 may be driven in various driving manners depending on a circuit design. For instance, each of the optical assemblies 10 or a portion thereof may be selectively and independently driven and controlled, e.g., turned on/of, generate dimmed or brighter light, etc. As a result, in the embodiment of the invention, a color contrast ratio can increase, and also the image quality can be improved because a bright image and a dark image may be clearly displayed on the screen of the display device.

In one example, the backlight unit 200 may be divided into a plurality of division driving regions to operate. More specifically, the backlight unit 200 may reduce a luminance of a dark image in one area while increasing a luminance of a bright image in another area based on a relation between a luminance of each of the division driving regions and a luminance of a video signal, thereby improving the contrast ratio and the definition.

For example, the backlight unit 200 may upwardly provide light by independently driving only some of the plurality of optical assemblies 10. For this, the light sources 220 included in the each of the optical assemblies 10 may be independently controlled.

An area of the display panel 100 corresponding to one optical assembly 10 may be divided into two or more blocks. The display panel 100 and the backlight unit 200 may be separately driven in block unit.

Because the plurality of optical assemblies 10 are assembled as described above to configure the backlight unit 200, a manufacturing process of the backlight unit 200 may be simplified and a manufacturing loss generated in the manufacturing process may be minimized. Hence, productivity of the backlight unit 200 may be improved. Further, the optical assembly 10 according to the embodiment of the invention may be applied to the backlight unit having various sizes by standardizing the optical assembly 10 and mass-producing the standardized optical assembly 10.

When one of the plurality of optical assemblies 10 of the backlight unit 200 becomes defective, only the defective optical assembly can be replaced without replacing all of the optical assemblies 10 of the backlight unit 200. Therefore, a replacing work is easy and the part replacing cost is saved.

Figure 37:
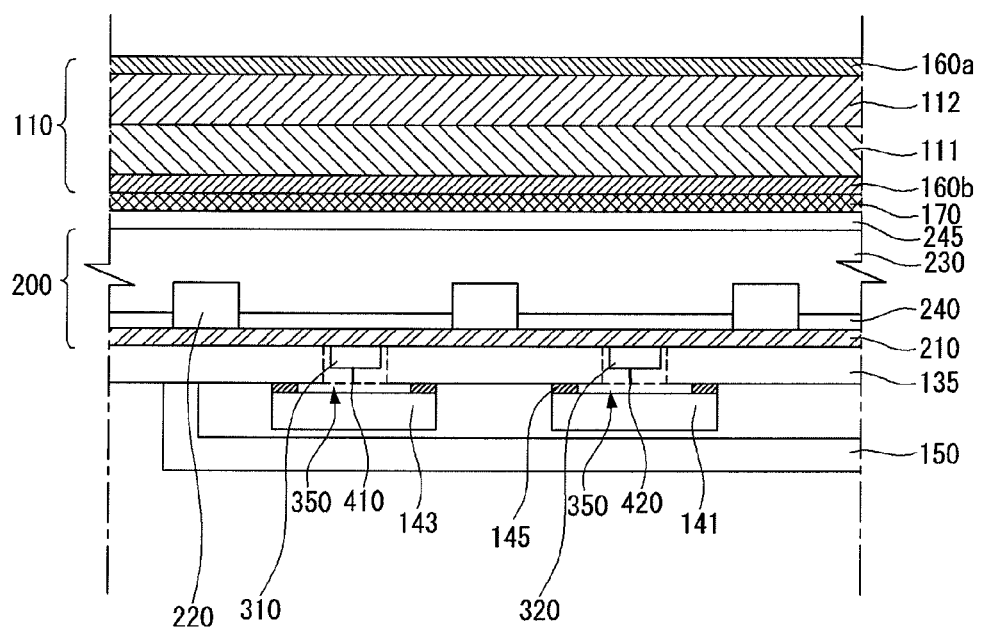
FIG. 37 is a cross-sectional view illustrating a configuration of a display device according to an exemplary embodiment of the invention.

FIG. 37 is a cross-sectional view illustrating a configuration of the display device according to the exemplary embodiment of the invention. Structures and components identical or equivalent to those illustrated in FIGS. 1 to 36 may be designated with the same reference numerals in FIG. 37, and a further description may be briefly made or may be entirely omitted.

As shown in FIG. 37, a display panel 110 including a first substrate 111, a second substrate 112, an upper polarizing plate 160a, and an lower polarizing plate 160b may closely adhere to the backlight unit 200 including the substrate 210, the plurality of light sources 220, and the resin layer 230. Here, although not shown, the backlight unit 200 can be any backlight unit discussed above in various examples and embodiments. Further, the first and second substrates 111 and 112 can be the first and second substrates 110 and 120 of FIG. 2. For instance, the display panel 110 can be or can correspond to the display panel 100 of FIG. 2. In a variation, an adhesive layer 170 may be formed between the backlight unit 200 and the display panel 100 to adhesively fix the backlight unit 200 to the lower surface of the display panel 100.

More specifically, the upper surface of the backlight unit 200 may adhere to the lower surface of the lower polarizing plate 160b using the adhesive layer 170. The backlight unit 200 may further include the diffusion plate 245 on the resin layer 230. A plurality of optical sheets may be formed between the diffusion plate 245 and the adhesive layer 170.

Further, a bottom plate 135 may be disposed on the bottom of the backlight unit 200 and may closely adhere to the lower surface of the substrate 210.

The display device in FIG. 37 and in other embodiments may include a display module, more particularly a driver for supplying a driving voltage and a power to the display panel 100 and the backlight unit 200. For example, the plurality of light sources 220 of the backlight unit 200 may be driven using the driving voltage received from the driver to emit light.

The driver may include a driving controller 141, a power supply unit 143, and a main board. The driver may be disposed and fixed onto a driver chassis 145 positioned on the bottom plate 135, so that the driver may be stably supported and fixed.

In the embodiment of the invention, a first connector 310 may be formed on the back surface of the substrate 210. For this, a hole 350 for inserting the first connector 310 may be formed in the bottom plate 135.

The first connector 310 may electrically connect the power supply unit 143 to the light source 220 to allow the driving voltage supplied by the power supply unit 143 to be supplied to the light source 220.

For example, the first connector 310 may be formed on the bottom of the substrate 210 and may be connected to the power supply unit 143 through a first cable 410. Hence, the first connector 310 may be used to transfer the driving voltage received from the power supply unit 143 through the first cable 410 to the light source 220.

An electrode pattern, for example, a carbon nanotube electrode pattern may be formed on top of the substrate 210. The electrode formed on top of the substrate 210 may contact the electrode formed in the light source 220 and may electrically connect the light source 220 with the first connector 410.

Further, the display device may include the driving controller 141 for controlling a drive of the display panel 100 and the backlight unit 200. For example, the driving controller 141 may be a timing controller.

The timing controller may control a driving timing of the display panel 100. More specifically, the timing controller may generate a control signal for controlling a driving timing of each of a data driver, a gamma voltage generator, and a gate driver that are included in the display panel 100 and may supply the control signal to the display panel 100.

The timing controller may synchronize with a drive of the display panel 100 and may supply a signal for controlling driving timing of the light sources 220 to the backlight unit 200, so that the backlight unit 200, more specifically, the light sources 220 operate.

As shown in FIG. 37, the driving controller 141 may be fixed to the driver chassis 145 positioned on the bottom plate 135, so that the driving controller 141 may be stably supported and fixed.

In the embodiment of the invention, a second connector 320 may be formed on the substrate 210. For this, a hole 350 for inserting the second connector 320 may be formed in the bottom plate 135.

The second connector 320 may electrically connect the driving controller 141 with the substrate 210, thereby allowing a control signal output from the driving controller 141 to be supplied to the substrate 210.

For example, the second connector 320 may be formed on the bottom of the substrate 210 and may be connected to the driving controller 141 through a second cable 420. Hence, the second connector 320 may be used to transfer a control signal received from the driving controller 141 through the second cable 420 to the substrate 210.

A light source driver may be formed on the substrate 210. The light source driver may drive the light sources 220 using the control signals supplied from the driving controller 141 through the second connector 320.

The driving controller 141 and the power supply unit 143 may be covered by the back case 150 and may be protected from any external impact or conditions.

The configuration of the display device shown in FIG. 37 is just one example of the invention. Therefore, the location or the numbers of each of the driving controller 141, the power supply unit 143, the first and second connector 310 and 320, and the first and second cables 420 and 430 may be changed as needed.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A light generating device comprising:
   a first layer;
   a plurality of light source devices disposed on the first layer and configured to emit light, at least one of the light source devices including a light emitting diode for generating the light;
   a reflection layer disposed on the first layer and configured to reflect the light emitted from the light source devices;
   a second layer covering the light source devices and the reflection layer;
   a diffusion layer disposed on the second layer and configured to diffuse the light emitted from the light source devices; and
   an auxiliary layer having a plurality of light shielding members placed between the second layer and the diffusion layer, the light shielding members placed at locations corresponding respectively to the light source devices,
   the auxiliary layer being separated from the second layer so as to create a first air space between a surface of the second layer and surfaces of the light shielding members, the first air space extending along the light source devices.

2. The light generating device of claim 1, wherein the auxiliary layer is separated from the diffusion layer so as to create a second air space between a surface of the auxiliary layer and a surface of the diffusion layer.

3. The light generating device of claim 2, wherein the second air space extends along the light source devices.

4. The light generating device of claim 2, wherein the diffusion layer is placed on the second layer without using an adhesive material.

5. The light generating device of claim 1, wherein the auxiliary layer is placed on the second layer without using an adhesive material.

6. The light generating device of claim 1, wherein the second layer encapsulates the light source devices and the reflection layer.

7. The light generating device of claim 1, wherein the locations corresponding respectively to the light source devices are above the light source devices.

8. The light generating device of claim 1, wherein the reflection layer includes a pattern which varies in a light emitting direction of the light source devices.

9. A light generating device comprising:
   a first layer;
   a plurality of light source devices disposed on the first layer and configured to emit light, at least one of the light source devices including a light emitting diode for generating the light;
   a reflection layer disposed on the first layer and configured to reflect the light emitted from the light source devices;
   a second layer covering the light source devices and the reflection layer; and
   an auxiliary layer having a plurality of light shielding members, and fixed to portions of the second layer by a first adhesive layer so as to create a first air space between a surface of the second layer and surfaces of the light shielding members.

10. The light generating device of claim 9, wherein the first adhesive layer is disposed only in areas between the light shielding members.

11. The light generating device of claim 9, wherein the light shielding members are placed to correspond with the light source devices.

12. The light generating device of claim 9, further comprising:
   a diffusion layer fixed to portions of the auxiliary layer by a second adhesive layer so as to create a second air space between a surface of the diffusion layer and a surface of the auxiliary layer.

13. The light generating device of claim 12, wherein the second air space is located only at areas corresponding to the light source devices.

14. The light generating device of claim 12, wherein the diffusion layer includes protrusions and the light shielding members are disposed on the protrusions of the diffusion layer.

15. The light generating device of claim 9, wherein the reflection layer includes a pattern which varies in a light emitting direction of the light source devices.

* * * * *